(12) United States Patent
Iwabuchi et al.

(10) Patent No.: US 9,124,758 B2
(45) Date of Patent: Sep. 1, 2015

(54) TELEVISION RECEIVER WITH A TV PHONE FUNCTION

(71) Applicant: HITACHI MAXELL, LTD., Ibaraki-shi, Osaka (JP)

(72) Inventors: Kazunori Iwabuchi, Yokohama (JP); Hiroki Mizosoe, Kawasaki (JP); Mutsumi Shimoda, Kawasaki (JP); Setiawan Bondan, Yamato (JP); Manabu Sasamoto, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 53 days.

(21) Appl. No.: 13/723,312

(22) Filed: Dec. 21, 2012

(65) Prior Publication Data

US 2013/0127977 A1  May 23, 2013

Related U.S. Application Data

(63) Continuation of application No. 12/457,257, filed on Jun. 4, 2009, now Pat. No. 8,363,087.

(30) Foreign Application Priority Data

Sep. 25, 2008  (JP) ................. 2008-246232

(51) Int. Cl.
*H04N 7/14* (2006.01)
*H04N 7/173* (2011.01)
(Continued)

(52) U.S. Cl.
CPC .............. *H04N 7/141* (2013.01); *H04N 7/142* (2013.01); *H04N 7/17318* (2013.01);
(Continued)

(58) Field of Classification Search
CPC ............ G01S 5/0072; H04M 1/72572; H04M 2201/40; H04M 2250/52; H04M 3/4936; H04M 3/5191; H04N 2007/145; H04N 21/254; H04N 21/42203; H04N 21/4223; H04N 21/431; H04N 21/4788; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/17318; H04W 4/18; H04W 4/185

USPC ........... 348/14.01–14.08, 14.09, 14.1, 14.11, 348/14.12, 14.13, 14.14, 15.15, 14.16; 455/566.1, 567, 414.1, 566; 379/265.03; 704/270
See application file for complete search history.

(56) References Cited

U.S. PATENT DOCUMENTS 5,526,037 A    6/1996  Cortjens et al.
5,684,918 A *  11/1997 Abecassis ..................... 386/349
(Continued)

FOREIGN PATENT DOCUMENTS

JP   05-056190   3/1993
JP   05-236472   9/1993
(Continued)

OTHER PUBLICATIONS
Japanese Office Action dated Aug. 5, 2014 in corresponding Japanese Application No. 2013-230194.
(Continued)

*Primary Examiner* — Khai N Nguyen
(74) *Attorney, Agent, or Firm* — Mattingly & Malur, PC

(57) ABSTRACT

A videophone system includes a processor which selectively sets a television (TV) broadcast program viewing function mode and videophone function mode in response to manual operation of a remote control, a decoder which performs, in the TV program view mode, a TV program-use decode function for decoding a broadcast program signal received from a TV tuner to thereby display it on a display screen while producing audio sounds by loudspeakers and which performs, in the videophone function mode a videophone-use decode function for decoding a videophone signal received from a distant party to thereby display on the screen an image of the distant party using the screen and speakers, and an encoder which performs a videophone-use encode function for encoding a video signal from a camera and a voice signal from a microphone to generate a videophone signal, which is sent to the distant party via a network.

18 Claims, 10 Drawing Sheets

(51) Int. Cl.
*H04N 21/254* (2011.01)
*H04N 21/422* (2011.01)
*H04N 21/4223* (2011.01)
*H04N 21/431* (2011.01)
*H04N 21/4788* (2011.01)

(52) U.S. Cl.
CPC ........ *H04N 21/254* (2013.01); *H04N 21/4223* (2013.01); *H04N 21/42203* (2013.01); *H04N 21/431* (2013.01); *H04N 21/4788* (2013.01)

(56) References Cited

U.S. PATENT DOCUMENTS

| | | | |
|---|---|---|---|
| 6,339,842 B1 | 1/2002 | Fernandez et al. | |
| 6,529,742 B1* | 3/2003 | Yang | 455/556.1 |
| 7,593,031 B2 | 9/2009 | Root et al. | |
| 8,013,938 B2 | 9/2011 | Shyu | |
| 8,326,355 B1* | 12/2012 | Fujisaki | 455/556.1 |
| 8,676,273 B1* | 3/2014 | Fujisaki | 455/567 |
| 2001/0041053 A1* | 11/2001 | Abecassis | 386/83 |
| 2003/0041333 A1* | 2/2003 | Allen et al. | 725/106 |
| 2004/0128700 A1* | 7/2004 | Pan | 725/136 |
| 2007/0070188 A1 | 3/2007 | Shyu | |
| 2007/0094691 A1* | 4/2007 | Gazdzinski | 725/62 |
| 2007/0139514 A1 | 6/2007 | Marley | |
| 2007/0216760 A1 | 9/2007 | Kondo et al. | |
| 2009/0013373 A1* | 1/2009 | Iizuka | 725/142 |
| 2009/0073253 A1 | 3/2009 | Lee | |
| 2009/0079813 A1 | 3/2009 | Hildreth | |
| 2009/0174762 A1* | 7/2009 | Takahashi | 348/14.02 |
| 2009/0251526 A1* | 10/2009 | Book | 348/14.01 |
| 2013/0033561 A1* | 2/2013 | Kwon et al. | 348/14.01 |

FOREIGN PATENT DOCUMENTS

| | | | |
|---|---|---|---|
| JP | A-05-236472 | 9/1993 | |
| JP | 07-184174 | 7/1995 | |
| JP | 08-289280 | 11/1996 | |
| JP | 08289280 A | * 11/1996 | ............. H04N 7/173 |
| JP | 09-083983 | 3/1997 | |
| JP | 2000184346 A | 6/2000 | |
| JP | 2001086475 A | 3/2001 | |
| JP | 2003-348510 | 12/2003 | |
| JP | 2006-20286 | 6/2004 | |
| JP | 2006-157610 | 6/2006 | |
| JP | 2007-300594 A | 11/2007 | |
| JP | 2008-079215 | 4/2008 | |

OTHER PUBLICATIONS

Domestic technical journal 2007-00349-006—Skype realizes handy video call.
Japanese Office Action received in corresponding Japanese Application No. 2013-230194 dated Mar. 10, 2015.

* cited by examiner

FIG.5

| ITEM # | VOD PROCESSING | PHONE PROCESSING | REMARKS |
|---|---|---|---|
| 1 | PW BUTTON DEPRESSED | PW BUTTON DEPRESSED | |
| 2 | • VOD BUTTON DEPRESSED<br>• BROWSER START | • PHONE BUTTON PRESSED<br>• BROWSER START | SERVER SENDS OPERATION SCREEN |
| 3 | TITLE SELECTED & DECIDED | CALL DESTINATION SELECTED & DECIDED | |
| 4 | CHECK CHARGE & PLAYBACK RIGHT | • DISPLAY CALLING MESSAGE<br>• ACTIVATE CAMERA, MIC & ENCODER | |
| 5 | • SWITCH DECODER INPUT<br>• DECODER OPERATION START<br>• PLAYBACK | • SWITCH DECODER INPUT<br>• DECODER OPERATION START<br>• TALKING BY PHONE | |
| 6 | • STOP BUTTON DEPRESSED<br>• DECODER STOP<br>• BROWSER STOP | • STOP BUTTON DEPRESSED<br>• DECODER STOP<br>• BROWSER STOP<br>• CAMERA, MIC & ENCODER DEACTIVATED | SAME BUTTON OPERATION AS DECODER IS DEACTIVATED |
| 7 | PLAYBACK END | CALL END | |

FIG.6

| | PW OFF | DURING TV WATCHING | DURING VOD WATCHING | OTHERS |
|---|---|---|---|---|
| CALL ARRIVED | • AUTO-PW ON<br>• CALL HANDLING<br>• TV WATCHING | • AUTO-VIDEOREC START<br>• CALL HANDLING<br>• AUTO-PLAY START | • AUTO-PAUSE<br>• CALL HANDLING<br>• PAUSE RESET | • PRESENT STATE SAVE<br>• CALL HANDLING<br>• RECOVER TO SAVED STATE |

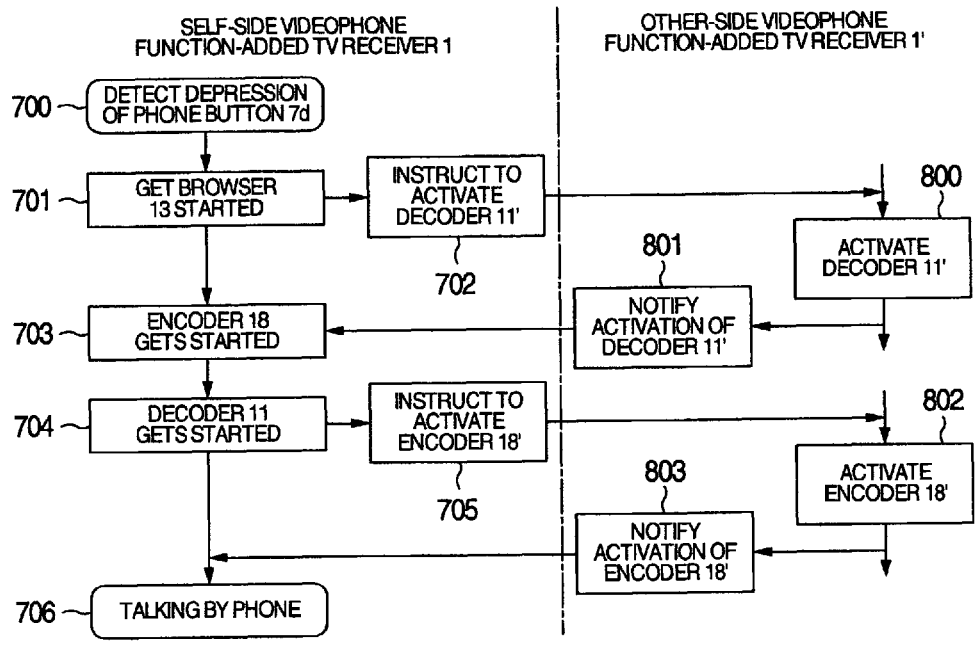
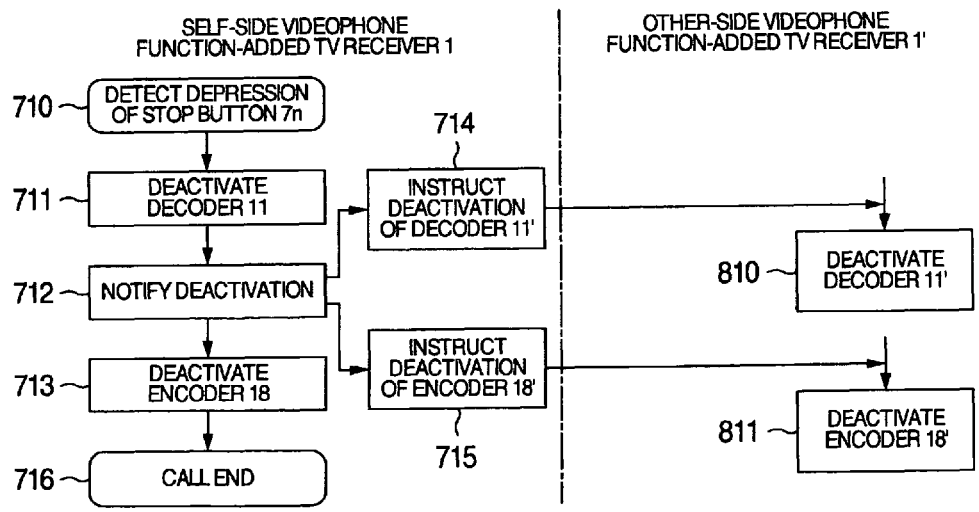

(a) OUTPUT TO RIGHT SPEAKER 3R
(b) OUTPUT TO LEFT SPEAKER 3L
(c) INPUT OF MIC 5
(d) INPUT OF ENCODER 18

TELEVISION RECEIVER WITH A TV PHONE FUNCTION

INCORPORATION BY REFERENCE

This application is a Continuation of U.S. application Ser. No. 12/457,257 filed Jun. 4, 2009. The present application claims priority from U.S. application Ser. No. 12/457,257 filed Jun. 4, 2009, now U.S. Pat. No. 8,363,087, which claims priority from Japanese application JP2008-246232 filed on Sep. 25, 2008, the content of which is hereby incorporated by reference into this application.

BACKGROUND OF THE INVENTION

1. Field of the Invention

The present technology relates to a television (TV) receiver set with TV phone functionality added thereto, which is arranged to have a video telephone call enabling means to thereby make it possible to perform video/voice-based telecommunication with another machine. This technology also relates to a TV phone system using videophone function-added TV receivers of this type.

2. Description of the Related Art

A telephone communication system and TV broadcast system are independently established systems. Traditionally, a telephone equipment and TV receiver set are quite different apparatuses. In cases where a telephone receives an incoming call and generates a ring sound or melody (calling sound) signaling the incoming call, a called party fails to hear this sound from time to time. A technique for avoiding this risk is disclosed, for example, in JP-A-5-56190. With this technique, a telephone is communicatively connected by a signal transmission line to a TV receiver, wherein the TV receiver is arranged so that upon receipt of an incoming call at the telephone, the TV receiver displays a phone call arrival message on its display screen.

Alternatively, a video telephone apparatus is also known, which is arranged to enable a user to make a phone call with a distant party at the other end of a line by transmission and reception of video images and voices. This type of videophone typically has a camera, microphone, loudspeaker and image display device and is designed to transmit toward the distant party's videophone video and voice signals that are obtained by the camera and microphone of the videophone on the self side, receive video and voice signals from the distant party's videophone, and display this video by the image display device while reproducing the voice by the speaker. In a case where transmission is done to the distant party's videophone, a video image and voice are subjected to compression processing (encoding) for transmission while simultaneously performing expansion processing (decoding) of a video and voice that are received from the distant party's videophone, and reproducing them at the image display device and speaker (for detail, see JP-A-9-83983).

SUMMARY OF THE INVENTION

In the prior known technique as disclosed in JP-A-5-56190, the TV receiver and the videophone are arranged so that these are discrete devices which operate independently of each other. Upon receipt of an incoming telephone call at the videophone during watching a TV broadcast program by the TV receiver, a message which notifies arrival of such phone call is displayed on the TV receiver's display screen so that a user easily knows that there is an incoming phone call. In this event, the user must walk to a place at which this videophone is put and perform manual operations for startup of talking with a caller on the videophone. This is a time-consuming and troublesome work for the user who is watching his or her preferred TV broadcast program.

In the case of not only starting a telephone call but also ending the phone call, the user is required to perform a manual operation for the phone call completion (e.g., putting a transceiver handset on a base unit or "cradle"). This operation also is performed at the location in which the videophone is placed.

In this way, traditionally, when there is an incoming phone call during watching a TV broadcast program by TV receiver, the user must move from a place at which he or she was there until then and perform manual operations for startup and completion of the phone call. These operations are time-consuming and troublesome works to the user.

To provide a solution to the above-stated problem, this technology provides a new and improved TV receiver with TV function (referred to as videophone function-added TV receiver hereafter) set having videophone call handling functionality, which performs both the reception of a digital broadcast program signal and the transmission and reception of a videophone signal between itself and another videophone function-added TV receiver at the other end of a communication line, wherein the videophone function-added TV receiver is characterized by having a decoder which decodes a received digital broadcast program signal and videophone signal, a display panel to which is supplied a video signal that is decoded by the decoder and which visually displays it on a screen, a loudspeaker module to which is supplied an audio/voice signal which is decoded by the decoder, a camera, a microphone, and an encoder which encodes output signals of the camera and microphone.

Another feature of the videophone function-added TV receiver lies in that it further includes an encoder which generates a videophone signal to be transmitted for videophone communications and a means for detecting completion of a videophone signal decoding operation of the decoder and for stopping an encoding operation of the encoder for generation of the videophone signal.

This technology also provides a video telephone system using a plurality of videophone function-added TV receiver sets which are linked together via a network for enabling users to make videophone calls between these videophone function-added TV receivers, wherein each videophone function-added TV receiver includes a decoder which has a videophone-use decode function for decoding a videophone signal from another videophone function-added TV receiver at the other end of a line and a TV program-use decode function for decoding a digital broadcast program received, a display panel which displays a video signal that is decoded by the decoder, a loudspeaker to which is supplied an audio signal that is decoded by the decoder, a camera, a microphone, an encoder which has a videophone-use encode function for encoding a video signal from the camera and an audio signal from the microphone to thereby generate a videophone signal to be sent forth toward a videophone function-added TV receiver of a distant party at the other end of a line in a videophone call session, a means for stopping a decoding operation of the decoder by means of the videophone-use decode function in responding to either a stop operation or the end of a videophone signal from the videophone function-added TV receiver of the distant party in the videophone call session, and a means for detecting completion of the videophone signal decoding operation performed by the decoder and for stopping the encoding operation of the encoder, wherein in case one of the videophone function-added TV receivers which are presently involved in a videophone communication session experiences termination of the decode operation of the decoder by means of the videophone-use decode function thereof in response to execution of the stop operation, when the encoding operation of the encoder is stopped in responding thereto, the videophone function-added TV receiver of the distant party, e.g., a calling party or a called party at the other end of the line, is such that the decoder stops its decoding operation by means of the videophone-use decode function thereof to thereby force the encoder to stop its encoding operation by means of the videophone-use encode function in response to the stop of the decoding operation.

This technology also provides a video telephone system using a plurality of videophone function-added TV receiver sets which are linked together via a network for enabling users to make videophone calls between these videophone function-added TV receivers, wherein each videophone function-added TV receiver includes a decoder which has a videophone-use decode function for decoding a videophone signal from another videophone function-added TV receiver at the other end of a line and a TV program-use decode function for decoding a digital broadcast program received, a display panel which displays a video signal that is decoded by the decoder, a loudspeaker to which is supplied an audio signal that is decoded by the decoder, a camera, a microphone, an encoder which has a videophone-use encode function for encoding a video signal from the camera and an audio signal from the microphone to thereby generate a videophone signal to be sent forth toward a videophone function-added TV receiver of a distant party at the other end of a line in a videophone call session, a means for stopping a decoding operation of the decoder by means of the videophone-use decode function in responding to either a stop operation or the end of a videophone signal from the videophone function-added TV receiver of the distant party in the videophone call session, a means for detecting completion of the videophone signal decoding operation performed by the decoder and for stopping the encoding operation of the encoder, and a means for detecting completion of the videophone signal decoding operation of the decoder and for sending a stop command signal to the videophone function-added TV receiver of the distant party at the other end of the line, wherein in case one of the videophone function-added TV receivers which are presently involved in a videophone communication session experiences termination of the decode operation of the decoder by means of the videophone-use decode function thereof in response to execution of the stop operation, when the encoding operation of the encoder is stopped in responding thereto, and also when the stop command signal is sent to the videophone function-added TV receiver of the distant party, this distant party's videophone function-added TV receiver operates so that the decoder stops its decoding operation by means of the videophone-use decode function thereof in response to receipt of the stop command signal and, in response to this decode operation stop, the decoder stops the decoding operation by means of the videophone-use decode function thereof.

This technology also provides a video telephone system using a plurality of videophone function-added TV receiver sets which are linked together via a network for enabling users to make videophone calls between these videophone function-added TV receivers, wherein each videophone function-added TV receiver includes a decoder which has a videophone-use decode function for decoding a videophone signal from another videophone function-added TV receiver at the other end of a line and a TV program-use decode function for decoding a digital broadcast program received, a display panel which displays a video signal that is decoded by the decoder, a loudspeaker to which is supplied an audio signal that is decoded by the decoder, a camera, a microphone, an encoder which has a videophone-use encode function for encoding a video signal from the camera and an audio signal from the microphone to thereby generate a videophone signal to be sent forth toward a videophone function-added TV receiver of a distant party at the other end of a line in a videophone call session, a means for stopping an encoding operation by means of the videophone-use encode function of the encoder in response to a stop operation of a videophone call, a means for detecting completion of an encoding operation of a video signal from the camera and an audio signal from the microphone to be performed by the encoder and for stopping the decoding operation by means of the videophone-use decode function of the decoder, and a means for detecting completion of the encoding operation of the encoder and for sending a stop command signal to a videophone function-added TV receiver of a distant party at the other end of a line, wherein in case one of the videophone function-added TV receivers which are presently involved in a videophone communication session experiences termination of the encode operation of the encoder by means of the videophone-use encode function thereof in response to execution of a stop operation, when the decoding operation of the decoder is stopped in responding thereto, and also when the stop command signal is sent to the videophone function-added TV receiver of the distant party, this distant party's videophone function-added TV receiver is such that the encoder stops its encoding operation by means of the videophone-use encode function thereof in response to receipt of the stop command signal and, in response to the stop of this encode operation, the decoder stops the decoding operation by means of the videophone-use decode function thereof.

This technology also provides a videophone function-added television receiver having a video camera detachably connected to an apparatus main body, wherein the TV receiver includes in the apparatus main body a decoder which has a television program-use decode function for decoding a digital broadcast program signal received and a videophone-use decode function for decoding a video telephone signal as received in a videophone call session, and a processor for control of each component, wherein the video camera has a camera, a microphone, a storage device which stores therein a video signal from the camera and an audio signal from the microphone, and an encoder to which are supplied a video signal as output from the camera and an audio signal as output from the microphone and which encoder has a videophone-use encode function of encoding the video signal and the audio signal into a video telephone signal to be transmitted to a videophone function-added television receiver of a distant party in a videophone call session and a video recording-use encode function for encoding the video signal and the audio signal into a video signal to be recorded in the storage device, and wherein in a state that the video camera is connected to the apparatus main body, when the decoder is in a state that it operates to perform the videophone-use decode function, the processor sets the encoder in a state that it operates to perform the videophone-use encode function thereof, resulting in the decoder being switched from the operation state of the videophone-use decode function to an operation state of the television program-use decode function and, alternatively, when the video camera is in a state that it is disconnected from the apparatus main body, the processor sets the encoder in a state that it operates to perform the video recording-use encode function.

In the videophone function-added television receiver, the video camera is a separate equipment independent of the apparatus main body and is detachably coupled to the apparatus main body.

Alternatively, in the videophone function-added television receiver, the video camera is internally mounted in the apparatus main body.

This technology also provides a videophone system using a plurality of videophone function-added TV receivers of the type stated above, which are linked together via a network for enabling users to make a videophone call between any two of the videophone function-added TV receivers, wherein the system includes a means for stopping an encoding operation by means of a videophone-use encode function of an encoder in response to a stop operation of a videophone call, a means for detecting completion of an encoding operation of a video signal from a camera and an audio signal from a microphone to be performed by the encoder and for stopping a decoding operation by means of a videophone-use decode function of a decoder, and a means for detecting completion of the encoding operation of the encoder and for sending a stop command signal to a videophone function-added TV receiver of a distant party at the other end of a line, wherein in case one of the videophone function-added TV receivers which are presently involved in a videophone communication session experiences termination of the encode operation of the encoder by means of the videophone-use encode function thereof in response to execution of a stop operation, when the decoding operation of the decoder is stopped in responding thereto, and also when the stop command signal is sent to the videophone function-added TV receiver of the distant party, this distant party's videophone function-added TV receiver is such that the encoder stops its encoding operation by means of the videophone-use encode function thereof in response to receipt of the stop command signal and, in response to this encode operation stop, the decoder stops the decoding operation by means of the videophone-use decode function thereof.

This technology also provides a videophone function-added TV receiver, wherein a decoder includes a first decoder operative to decode the received digital broadcast program signal and a second decoder for decoding the video telephone signal, wherein a display panel performs two-window display for simultaneously displaying on one screen a video image based on the digital broadcast program signal decoded by the first decoder and a video image based on the video telephone signal decoded by the second decoder, wherein an echo canceller is provided to receive an audio signal as output from the microphone and an input audio signal of the speaker, and wherein an echo signal due to unwanted mixture of audio sounds from the speaker into the audio signal as output from the microphone is canceled by the echo canceller using the input audio signal of the speaker and is then supplied to an encoder.

The technology further provides a videophone system using videophone function-added TV receivers of the type stated supra, wherein a decoder includes a first decoder operative to decode the received digital broadcast program signal and a second decoder for decoding the video telephone signal, wherein a display panel performs two-window display for simultaneously displaying on one screen a video image based on the digital broadcast program signal decoded by the first decoder and a video image based on the video telephone signal decoded by the second decoder, wherein an echo canceller is provided to receive an audio signal as output from the microphone and an input audio signal of the speaker, and wherein an echo signal due to mixture of audio sounds from the speaker into the audio signal as output from the microphone is canceled by the echo canceller using the input audio signal of the speaker and is then supplied to an encoder.

With the above-stated arrangement, it is possible to provide a TV receiver with increased usability for users. For example, video image displaying for a videophone call is performed using the display screen and loudspeaker module which are inherently used for digital TV broadcast programs; so, it is possible for a user to start a phone call and finish the call without having to move from a place at which s/he is enjoying a digital TV broadcast program. This saves the user's labor for such moving action. Additionally, upon completion of the phone call, the decoder and encoder are automatically rendered inoperative without requiring the user to perform manual operations. This results in a decrease in labor for such operations. It is also possible to prevent a calling party from becoming aware of the digital TV broadcast program which is watched by the user.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing, in table form, processing procedures in a video-on-demand (VOD) function mode and videophone function mode of the videophone function-added TV receiver shown in FIGS. 1 and 2.

FIG. 6 is a diagram showing one example of inbound call handling processing in a case where there is a call-in of the videophone function-added TV receiver shown in FIG. 1 or FIG. 2.

FIGS. 7A and 7B are flow charts showing practical examples of forced start/stop control operations of a decoder and encoder, which are executed by respective processors upon startup and completion of a phone call between the videophone function-added TV receivers shown in FIG. 3.

DESCRIPTION OF THE EMBODIMENTS

Figure 1:
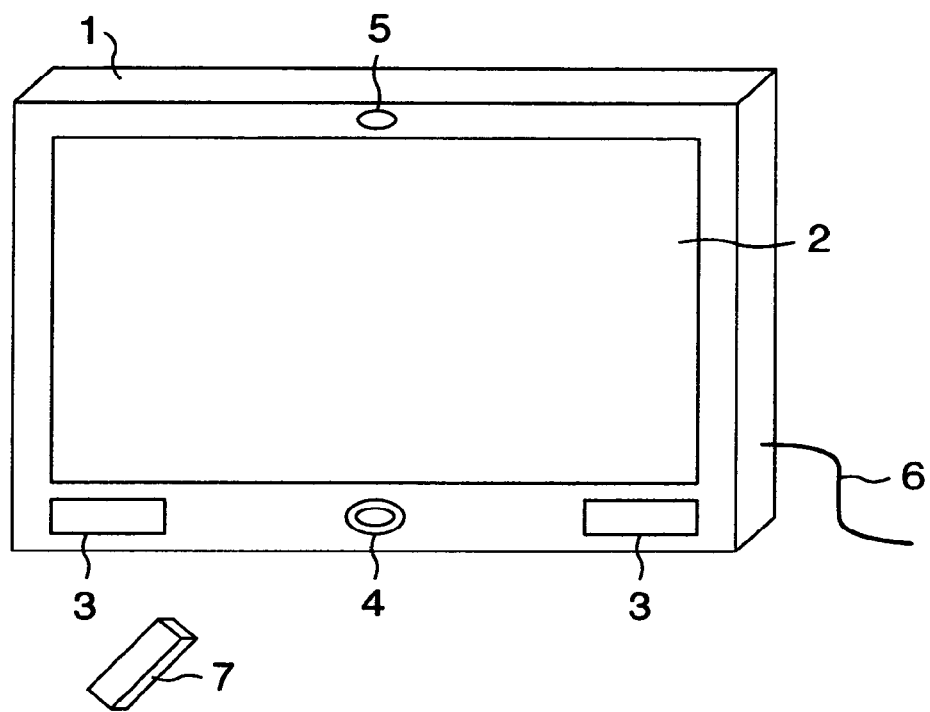
FIG. 1 is a diagram showing a perspective view of exterior appearance of a videophone function-added television (TV) receiver set in accordance with a first embodiment.

Currently preferred embodiments will be described with reference to the accompanying figures of the drawing below.

FIG. 1 is a diagram showing a perspective view of exterior appearance of a television (TV) receiver set with additional video telephone functionality in accordance with a first embodiment. The videophone function-added TV receiver is designated by reference numeral 1, which has a display screen 2, loudspeaker module 3, video camera 4, microphone 5, communications network cable 6, and wireless remote control device 7.

As shown in FIG. 1, the loudspeaker module 3 includes a couple of spaced-apart speakers, which are mounted in a front panel of housing of the videophone function-added TV receiver 1 at right and left side corners below the display screen 2. The camera 4 is embedded in the front panel at a center position of lower side which is midway between the right and left speakers. This camera 4 has its image pickup lens which is exposed to outside. The microphone 5 is built in the front panel of housing at an upper center position above the display screen 2. This first embodiment is the one that has a built-in video camera in the housing of videophone function-added TV receiver 1.

The videophone function-added TV receiver 1 also has an antenna (not shown) for enabling it to receive digital broadcast programs and, simultaneously, is linked by the network 6 to a video-on-demand (VOD) server, thereby enabling it to receive services (downloads) of any available contents from this VOD server—say, VOD contents. The videophone function-added TV receiver 1 is also linked by the network 6 to other videophone function-added TV receivers and thus is capable of performing video telephone communications with these TV receivers.

The videophone function-added TV receiver 1 of FIG. 1 is controlled by the remote control 7 and, by a manual operation of this remote control, receives digital broadcast programs, downloads VOD contents and/or makes a videophone call with another videophone function-added TV receiver.

Note here that in the case of considering the height due to recent growth in size of TV receivers, when a user watches the display screen while he or she sits on a sofa in a room, such as a family room, if the camera 4 is disposed on upside of the display screen 2, the camera 4 looks down the user and, in this state, captures or "shoots" an image of the user. Accordingly, when the videophone function-added TV receiver 1 is used as a videophone, a video image of the user who bends down his or her head is transmitted to and displayed at a videophone function-added TV receiver of a distant party at the other end of a communication line. It is generally not commeasurable to display the image of a calling or called party who looks down in a videophone call session. Consequently, in this embodiment, the camera 4 is disposed on the lower side of the display screen 2.

The speakers 3 are located in close proximity to the camera 4. In order to prevent deterioration of performance of the microphone 5 otherwise occurring due to unwanted mixture of vibrations (audio/voice sounds) of the speakers 3 into the microphone 5, this microphone 5 is spaced apart from the speakers 3 and is disposed at the center position above the display screen 2.

Figure 2:
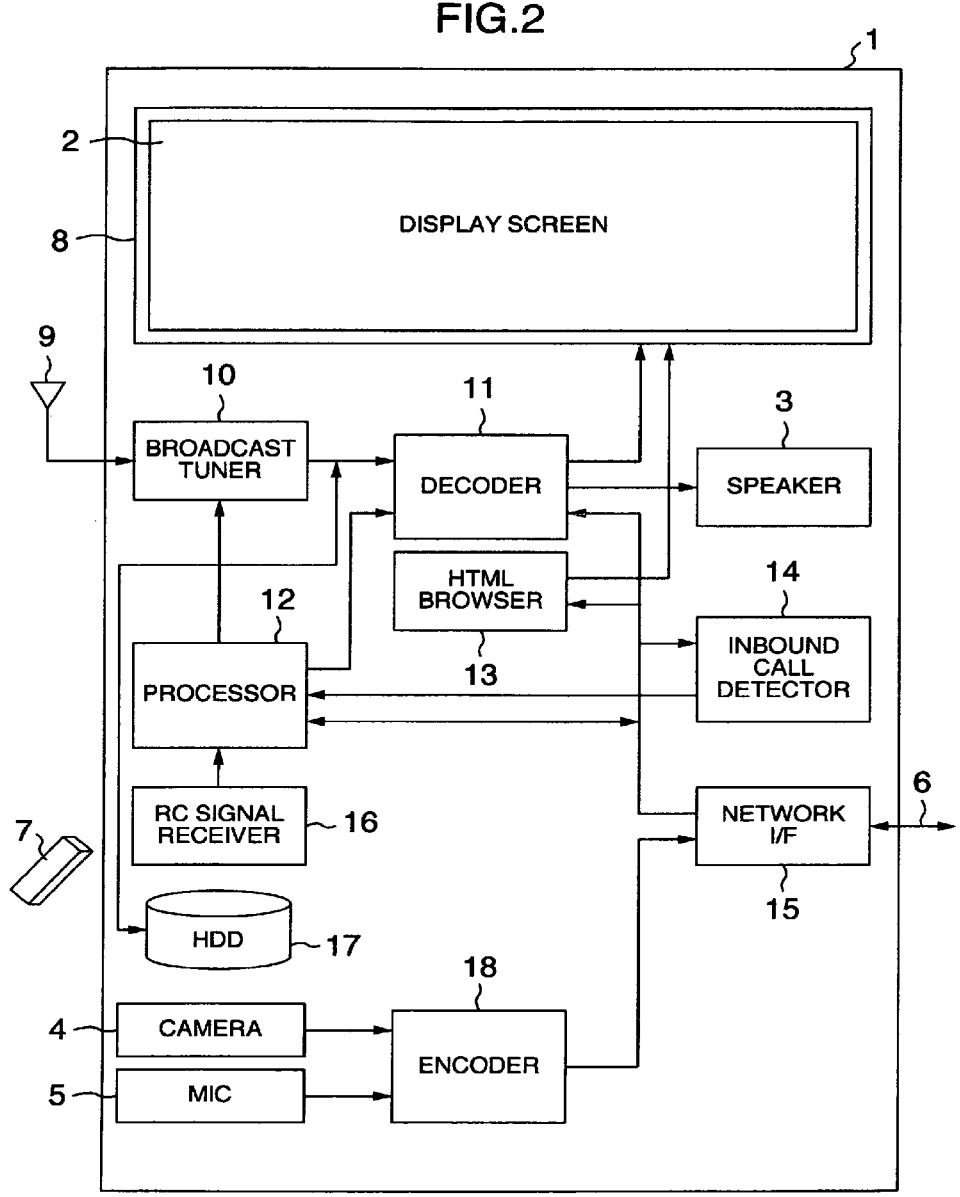
FIG. 2 is a block diagram showing a practical example of an electrical/electronic circuit configuration of the videophone function-added TV receiver of the first embodiment shown in FIG. 1.

FIG. 2 is a block diagram showing a practical example of electrical/electronic circuit configuration of the TV phone function-added TV receiver 1 of the first embodiment shown in FIG. 1. As shown herein, this TV receiver includes the display panel 8, an antenna 9, TV broadcast tuner 10, decoder 11, processor 12, hypertext makeup language (HTML) browser 13, inbound call detection device 14, network interface (I/F) 15, remote control signal receiver 16, storage unit 17 such as a hard disk drive (HDD) or solid-state disk (SSD) using nonvolatile semiconductor memory or else, and encoder 18. Note that those corresponding to the parts or components of FIG. 1 are denoted by the same reference numerals.

In FIG. 2, the videophone function-added TV receiver 1 of this embodiment has a similar configuration of standard TV receiver set and additionally has several components including the network I/F 15 for communication with external equipment via the network 6, the camera 4 and microphone 5 plus inbound call detector 14 for videophone communications, and the HTML browser 13 for VOD contents downloading.

The videophone function-added TV receiver 1 has a TV program viewing function for permitting a user to watch a TV program by receiving a digital broadcast program signal by the antenna 9 in response to a manual operation of the remote control 7 and for displaying video image information of such broadcast program on the display screen 2 of display panel 8 while at the same time outputting its audio information from the speakers 3, a video telephone function for transmitting a videophone signal containing therein both video image information captured by the camera 4 and audio information that was input from the microphone 5 toward another similar videophone function-added TV receiver of a distant party at the other end of a line (referred to hereinafter as the other-side videophone function-added TV receiver), not shown, via the network 6 that is linked to the videophone function-added TV receiver 1 and receiving a videophone signal from this other-side videophone function-added TV receiver via the network 6 and also displaying its video image information on the display screen 2 of display panel 8 while simultaneously outputting its audio information from the speakers 3 to thereby perform videophone telecommunication with the distant party at the other end of the line, and a VOD function for requesting a server (not shown) to provide desired contents of a moving picture and/or text data via the network 6 and acquiring moving-picture contents to be provided from this server via the network 6 in reply to this request and then displaying such moving picture information on the display screen 2 while outputting its audio information from the speakers 3. These functions are selectable by manual operation of the wireless remote control 7.

An operation signal from the remote control 7 which indicates an instruction operation thereof is received at the remote control signal receiver 16 and then supplied to the processor 12. This processor 12 performs control of respective units in accordance with the operation signal supplied. When execution of TV program viewing function is instructed by the remote control 7, the processor 12 sets up a mode for executing the TV broadcast program viewing function (referred to as TV broadcast program viewing function mode hereinafter). When execution of the video telephone function is instructed by the remote control 7, the processor 12 sets up a mode for executing the video telephone function (referred to as videophone function mode hereafter). When execution of the VOD function is instructed by the remote control 7, the processor 12 sets up a mode for executing the VOD function (referred to as VOD function mode hereafter).

An explanation will next be given of a system with reference to FIG. 3, in which system the videophone function-added TV receiver 1 is used.

Figure 3:
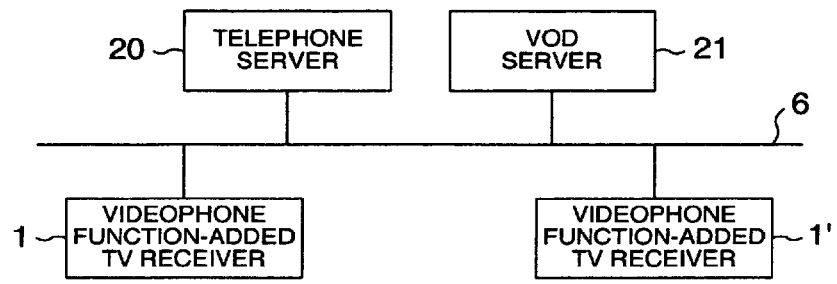
FIG. 3 is a system diagram showing one embodiment of a video telephone system using videophone function-added TV receivers.

FIG. 3 is a diagram schematically showing a principal configuration of one embodiment of a video telephone system using videophone function-added TV receivers. This system includes the videophone function-added TV receiver 1, another (distant party's) videophone function-added TV receiver 1' on the other end of a communication line, a telephone server 20 and VOD server 21. Parts corresponding to those of FIG. 2 are designated by the same reference numeral.

As shown in FIG. 3, the videophone function-added TV receivers 1 and 1', telephone server 20 and VOD server 21 are communicatively linked together via the network 6. Although a large number of similar videophone function-added TV receivers are connected to the network 6, only two videophone function-added TV receivers 1 and 1' are shown in FIG. 3 for the purpose of convenience in illustration, wherein one of them is assumed to be a certain user's videophone function-added TV receiver 1 whereas the other of them is the "other-side" videophone function-added TV receiver 1' of a distant party at the other end of a line which performs videophone communication with the "self-side" videophone function-added TV receiver 1.

It should be noted that the other-side videophone function-added TV receiver 1' is similar in configuration to the videophone function-added TV receiver 1. Although its configuration is not specifically illustrated herein, the other-side videophone function-added TV receiver 1' has similar parts or components similar to those of FIG. 2, which will be denoted by corresponding reference numerals with an apostrophe (') being added thereto, such as decoder 11', encoder 18', etc. Also note that although the explanation below is mainly directed to the videophone function-added TV receiver 1, the same goes with the other-side videophone function-added TV receiver 1'.

When the videophone function-added TV receiver 1 is set in the TV broadcast program viewing function mode, a digital broadcast program signal which is received at an antenna that is not depicted (i.e., the antenna 9 of FIG. 2) is subjected to decode processing, thereby enabling such TV program to be viewed by human eyes. When the videophone function-added TV receiver 1 is set in the videophone function mode, the videophone function-added TV receiver 1 and other-side videophone function-added TV receiver 1' are linked together by the telephone server 20 so that these are communicable with each other via the network 6. When the videophone function-added TV receiver 1 is in the VOD function mode, the videophone function-added TV receiver 1 is linked via the network 6 to the VOD server 21 so that requested contents are provided from the VOD server 21 to the videophone function-added TV receiver 1 in response to a request from the videophone function-added TV receiver 1.

Figure 4:
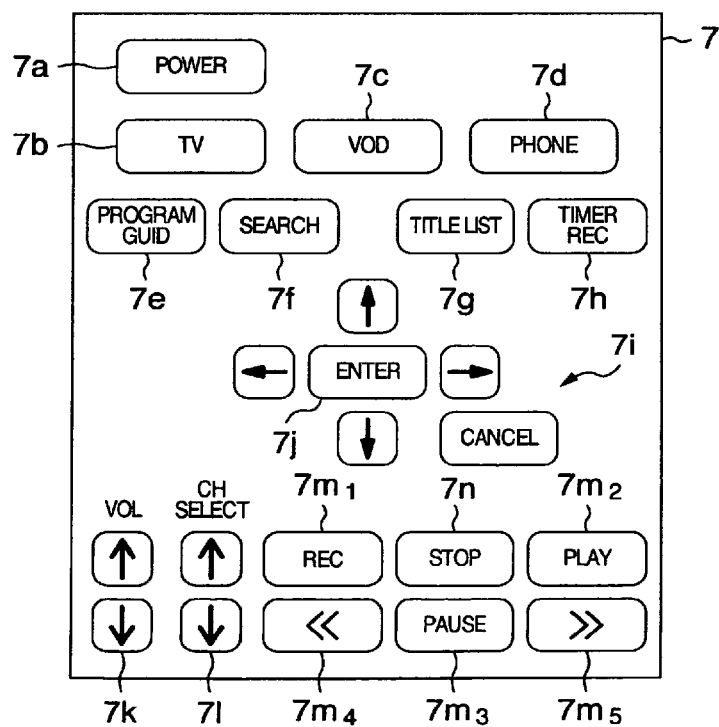
FIG. 4 is a plan view of an example of operation part of a remote control in FIGS. 1 and 2.

FIG. 4 is a plan view of an example of the wireless remote control 7 shown in FIGS. 1 and 2. This remote control 7 has on its front panel several manual operation buttons, including a "Power" button $7a$, "TV" button $7b$, "VOD" button $7c$, "Phone" button $7d$, "Program Guide" button $7e$, "Search" button $7f$, "Title List" button $7g$, "Timer Rec" button $7h$, up-down/right-left arrow buttons $7i$ in cross-like layout, "Enter" button $7j$, sound volume adjustment buttons $7k$, channel select buttons $7l$, "Video Rec" button $7m_1$, "Play" button $7m_2$, "Pause" button $7m_3$, "REW" button $7m_4$, "FF" button $7m_5$ and "Stop" button $7n$.

As shown in FIG. 4, the TV remote control 7 has several kinds of operation buttons for control of the videophone function-added TV receiver 1 (FIG. 2), including the power button $7a$ for turning power on and off, the "Program Guide" button $7e$ for causing an online digital broadcast program guide table to be displayed on the display screen 2 of display panel 8 (FIG. 2), the "Search" button $7f$, the "Title List" button $7g$ for display of a list of titles of recorded digital broadcast programs or a list of titles of available contents in the VOD server 21 (FIG. 3), the "Timer Rec" button $7h$ for setup of timer recording of digital broadcast programs, the set of cross-like layout arrow buttons $7i$ for operations of movement of a cursor to be displayed on the display screen 2 of display panel 8, the "Enter" button $7j$ for selection and determination of an item in the title list or else being displayed on the display screen 2 of display panel 8, the sound volume buttons $7k$ for manual adjustment of a sound level of the speakers 3 (FIG. 2), the channel select buttons $7l$ for designating a reception channel of digital broadcast program, the "Video Rec" button $7m_1$ for setting the timer recording of a digital broadcast program(s), the "Play" button $7m_2$ for playback of any one of digital broadcast programs recorded, the "Pause" button $7m_3$ for temporary stop of the playback of a digital broadcast program being viewed, the "REW" button $7m_4$ for fast reserve move or "rewind" of a present playback part of recorded digital broadcast program, the "FF" button $7m_5$ for fast forward move or "advance" of a present playback part of recorded digital broadcast program, and the "Stop" button $7n$ for stopping the playback of a recorded digital broadcast program.

In addition to these manual operation buttons, the TV remote control 7 further has the "TV" button $7b$ for setting the videophone function-added TV receiver 1 in the TV broadcast program viewing function mode, the "VOD" button $7c$ for setting the videophone function-added TV receiver 1 in the VOD function mode, and the "Phone" button $7d$ for setting the videophone function-added TV receiver 1 in the videophone function mode. These function modes are reset whenever the power button $7a$ is manually operated to turn power off. When the power button $7a$ is operated to turn power on, the videophone function-added TV receiver 1 is automatically set in the TV broadcast program viewing function mode in a similar way to standard TV receivers so that it becomes in the state that a digital broadcast program is received of the channel that has been set immediately before the last power-off.

Note here that the "TV" button $7b$ is for receiving a digital broadcast program and displaying it on the display screen 2 of display panel 8 when an image other than that of the received digital broadcast program is visualized on the display screen 2 of display panel 8 in an operation mode except the videophone function mode and the VOD function mode (i.e., the TV broadcast program viewing function mode), such as during recording/playback of a digital broadcast program or when a TV program guide or a list of titles of recorded digital broadcast programs is being displayed thereon.

Also note that the videophone function mode and VOD function mode are such that each mode is reset in response to an operation of the "Stop" button $7n$, resulting in the mode being changed to the TV broadcast program viewing function mode to thereby establish a state that a digital broadcast program received is displayed on the display screen 2 of display panel 8.

An explanation will next be given of each of the above-stated functions of the videophone function-added TV receiver 1 shown in FIG. 2 to be selected in response to a manual operation of the remote control 7 while referring to FIGS. 3 and 4 also.

In FIG. 2, when the "Power" button 7a of TV remote control 7 is manually operated to turn on the power of videophone function-added TV receiver 1 and get this TV receiver started, or alternatively, when the "TV" button 7b of remote control 7 is depressed while the videophone function-added TV receiver 1 is presently in the above-stated operation state, an operation signal of this remote control 7 is received by the RC signal receiver 16 and supplied to the processor 12. The processor 12 performs decision processing based on this operation signal to determine that the TV broadcast program viewing function mode is required from the remote control 7. At this time, the processor 12 renders the broadcast tuner 10, decoder 11, display panel 8 and speakers 3 operative, thereby setting up a state for execution of the TV broadcast program viewing function which enables reception of a digital broadcast program signal to be watched. In this case, when the user wants to watch his or her desired digital broadcast program, the user depresses the channel select button 7l of remote control 7 to thereby designate a channel of such program whereby the processor 12 controls the broadcast tuner 10 so that this tuner 10 is set in a state for selecting this designated channel.

An encoded digital TV broadcast program signal, such as image compression or the like, being applied to a moving picture of a broadcast program which is received by the antenna 9 and the channel of which is selected by the broadcast tuner 10 is supplied to the decoder 11 and applied decoding processing, such as image expansion or else, to thereby obtain a video signal of the image (e.g., moving picture or still image) along with an audio signal thereof. This video signal is supplied to the display panel 8 so that the image of the selected TV broadcast program is visually displayed on the display screen 2 while at the same time letting the audio signal be fed to the speakers 3 for output of audio sounds of this TV broadcast program.

The decoder 11 has a function of decoding the video signal and audio signal of a received digital broadcast program signal (referred to as TV program-use decode function hereinafter), a function of decoding an incoming video telephone signal from the other-side videophone function-added TV receiver 1' (FIG. 3), which signal is received at the network I/F 15 (referred to hereinafter as videophone-use decode function), and a function of decoding VOD contents of images (moving pictures or still images) and audio sounds which are supplied from the VOD server 21 (FIG. 3) and received by the network I/F 15. Any one of these functions is switchable under control of the controller 12 in responding to receipt of an instruction signal from the TV remote control 7, which indicates the user's desired function mode that is set through manual operations of the remote control 7.

When the videophone function-added TV receiver 1 is presently set in the TV broadcast program viewing function mode, the decoder 11 is set by the processor 12 in the state for execution of the TV program-use decode function; so, it decodes a received digital broadcast program signal from the broadcast tuner 10. In this state, when the "Rec" button $7m_1$ (FIG. 4) of remote control 7 is manually operated, the processor 12 controls the storage unit 17, causing it to perform video-recording of the digital broadcast program signal being received. In this TV broadcast program viewing function mode, when the "Tile List" button 7g (FIG. 4) of remote control 7 is depressed, a list of the tiles of recorded digital programs in the storage unit 17 is displayed on the display screen 2 of display panel 8. In this case, when a desired recorded program is selected from this recorded program title list through manual operation of the arrow buttons 7i and "Enter" button 7j (FIG. 4) and then the "Play" button $7m_2$ of remote control 7 is pressed, a recorded program signal that is selected from among those being stored in the storage unit 17 is played back and decoded by the decoder 11, resulting in a video signal being supplied to the display panel 8 while letting an audio signal be fed to the speakers 3.

When the "VOD" button 7b (FIG. 4) of the remote control 7 is operated, the decoder 11 executes the VOD-use decode function under control of the processor 12; then, the HTML browser 13 is rendered operative, followed by setup of the VOD function mode.

Then, the VOD contents from the VOD server 21 (FIG. 3) which are received at the network I/F 15 are such that moving-picture image contents and still image contents plus audio contents thereof are decoded by the decoder 11 and then supplied to the display panel 8 and speakers 3, resulting in visualization and reproduction of these contents. Text data in the VOD contents is supplied to the HTML browser 13 and converted into data displayable on the display screen 2 and then supplied to the display panel 8. It is noted that although not specifically depicted herein, the contents to be provided from the VOD server 21 are supplied to the decoder 11 and/or the HTML browser 13 for viewing/listening and playback at the user's desired time and also supplied to the display panel 8 and speakers 3 for enabling the contents to be reproduced thereby.

Additionally, when the "VOD" button 7b of the remote control 7 is depressed, a request signal is transmitted from the processor 12 to the VOD server 21 through the network I/F 15 and network 6. In responding thereto, data of titles of all contents available from the VOD server 21 are provided. The title data is passed to the HTML browser 13 through the network I/F 15 whereby a title list window image or "menu" is generated and supplied to the display panel 8. When the user's preferred contents are designated from this menu window by manual operations of the cross-like layout arrow buttons 7i and "Enter" button 7j, the processor 12 issues and sends a request of the contents to the VOD server 21 via the network I/F 15 and network 6. With this procedure, the VOD contents requested are provided from the VOD server 21 and are processed in the way stated supra so that the contents are displayed on the display screen 2 of display panel 8 while letting audio sounds thereof be output from the speakers 3.

After completion of the VOD contents, in case the user further wants to get another kind of VOD contents, when the "Title List" button 7g (FIG. 4) is depressed in the state that the VOD function mode is set (i.e., none of the "TV" button 7b and "Phone" button 7d are pressed), a request signal is sent to the VOD server 21 via the network I/F 15 and network 6 in the above-stated way. In response thereto, data of titles of all the contents available from the VOD server 21 are provided. The title data is supplied to the HTML browser 13 via the network I/F 15 whereby a title list window is generated and supplied to the display panel 8. By selecting a desired title of contents using the remote control 7 in the way stated previously, the requested contents are provided from the VOD server 21 and then displayed on the display screen 2 of display panel 8 while letting audio sounds be played back by the speakers 3.

When the "Videophone" button 7c (FIG. 4) of the remote control 7 is depressed, the decoder 11 is set in a state for execution of the videophone-use decode function under setup control of the processor 12. Simultaneously, the processor 12 renders the camera 4 and microphone 5 plus encoder 18 operative and sets up the videophone function mode. Note that the inbound call detector 14 is always in the state capable of detecting an incoming telephone call from the other-side videophone function-added TV receiver 1' (FIG. 3) even when the videophone function-added TV receiver 1 is in the power-off state.

Then, a video signal by means of image pickup of the camera and an audio signal indicative of voice sounds as input to the microphone 5 are supplied to the encoder 18 and subjected to compression processing (encoding) which is pursuant to videophone telecommunications so that a videophone signal which is obtained thereby is sent from the network I/F 15 via network 6 to the other-side videophone function-added TV receiver 1' (FIG. 3). A videophone signal from the other-side videophone function-added TV receiver 1' is received by the network I/F 15 and supplied to the decoder 11 so that a video signal and audio signal thereof are subjected to expansion processing (decoding), causing such decoded signals to be supplied to display panel 8 and speakers 3. This enables videophone telecommunication between the videophone function-added TV receiver 1 and the other-side videophone function-added TV receiver 1'.

Alternatively, when there is an incoming phone call from the other-side videophone function-added TV receiver 1', this call-in is detected by the inbound call detector 14; then, this detection result is notified to the processor 12. In responding thereto, the processor 12 renders the camera 4 and microphone 5 plus encoder 18 operative to thereby set up the videophone function mode, resulting in setup of the state that enables videophone communication with the other-side videophone function-added TV receiver 1'.

The encoder 18 has a function of applying videophone telecommunication-related encode processing to a video signal from the camera 4 and an audio signal from the microphone 5 (referred to as videophone-use encode function hereinafter) and a function of performing encode processing that is similar to the encoding of digital broadcast program signals (referred to hereafter as videorecording-use encode function), wherein these encode functions are switchable by control of the remote control 7.

When the "Phone" button 7d of the remote control 7 is manually operated resulting in setup of the videophone function mode, the processor 12 that detected this mode setup causes the encoder 18 to be set in the state that it executes the videophone-use encode function so that a videophone signal is generated to thereby enable videophone telecommunication with the other-side videophone function-added TV receiver 1' in the way stated supra. Now, suppose that the videophone function-added TV receiver 1 is in the TV broadcast program viewing function mode (thus, the decoder 11 is in the state for execution of the TV program-use decode function). When an appropriate button of the remote control 7 for image pickup instruction is manually operated for example, the encoder 18 is controlled so that the videorecording-use encode function is set up so that the camera 4 and microphone 5 are rendered operative. A video signal from the camera 4 and an audio signal from the microphone 5 in this case are encoded by the encoder 18 by means of the videorecording-use encode function in a similar way to the digital broadcast program signal received. The encoded signal is stored in the storage unit 17 as a videorecording signal. When this videorecord signal being stored in the storage unit 17 is selected using the above-stated title list, and then the "Play" button $7m_2$ (FIG. 4) of the remote control 7 is depressed, this videorecord signal is read out of the storage unit 17, supplied to the decoder 11 and decoded thereat, resulting in such video signal being supplied to the display panel 8 while letting its associative audio signal be fed to the speakers 3. In this case, the videophone function mode is not set yet; so, the video signal and audio signal from this encoder 18 are not supplied to the network I/F 15. Thus, the information of a situation in front of the videophone function-added TV receiver 1 is acquired by the camera 4 and microphone 5. This information is temporarily stored in the storage unit 17 in a manner that the information is later browsable by the videophone function-added TV receiver 1.

FIG. 5 is a diagram showing, in contradistinction, the processing procedures of the VOD function mode and videophone function mode.

Firstly, the processing procedure of VOD function mode will be described. In FIG. 5, suppose that the videophone function-added TV receiver 1 is now in the power-off state. The power button 7a (FIG. 4) of the remote control 7 is manually operated, causing the TV receiver 1 to be set in the power-on state (at item No. 1). This operation is not necessary when the TV receiver has already been set in the power-on state.

Next, when the "VOD" button 7c of remote control 7 is pressed, the processor 12 detects this button operation and gets the HTML browser 13 started (at item #2).

The processor 12 also issues and sends a request for contents to the VOD server 21 (FIG. 3) via the network I/F 15 and network 6 in the way stated above. In responding thereto, list information of the titles of VOD contents available from this VOD server 21 are provided, as the information for an operation screen or "window," to the videophone function-added TV receiver 1 via the network 6 and network I/F 15. At the videophone function-added TV receiver 1, this list information is supplied to the HTML browser 13 so that a menu (list) window of such VOD contents is prepared and displayed on the display screen 2 of display panel 8 as an operation window. When the user selects and determines from this menu window his or her desired title of VOD contents through manual operations of the cross-like layout of arrow buttons 7i and "Enter" button 7j (at item #3), the processor 12 sends information as to this selection and decision to the VOD server 21 for requesting download of the selected VOD contents. In response thereto, the VOD server 21 performs checking of the playback right of this user. If this check is completed successfully, accounting/billing processing against the VOD contents is performed. Then, a notice of allowance is issued regarding the provision of the VOD contents to the videophone function-added TV receiver 1, followed by startup of download of the VOD contents (at item #4 in FIG. 5).

Upon receipt of this notice of allowance at the videophone function-added TV receiver 1, the processor 12 sets the decoder 11 in the VOD-use function mode and then causes an operation in this mode to get started. This results in the VOD function mode being set up so that the VOD contents to be downloaded from the VOD server 21 are supplied from the network I/F 15 to the decoder 11. Then, a decoded moving-picture/still-image signal is supplied to the display panel 8, and simultaneously, a decoded audio signal is fed to the speakers 3, resulting in the VOD contents being displayed and played back (at item #5).

When the user depresses the "Stop" button 7n of the remote control 7 such as due to completion of the playback of the VOD contents, the decoder 11's VOD-use decode function execution state is forced to go off and then switched to the TV program-use decode function execution state. Simultaneously, the processor 12 renders the HTML browser 13 inoperative (at item #6).

With this procedure, the VOD function mode comes to an end, causing the videophone function-added TV receiver 1 to be set in the TV broadcast program viewing function mode (item #7).

An explanation will next be given of the processing procedure in the videophone function mode. Now, suppose in FIG. 5 that the videophone function-added TV receiver 1 is in the power-off state. By manually operating the power button 7a (FIG. 4) of remote control 7, the TV receiver 1 is set in the power-on state (at item #1). This operation is unnecessary when the TV receiver has already been set in the power-on state.

Then, when the "Phone" button 7d of remote control 7 is depressed, the processor 12 detects it and renders the HTML browser 13 operative (item #2).

In response to the startup of the HTML browser 13, a list window of registered phone numbers is prepared from the phone number data being stored in a memory and supplied to the display panel 8 for visual display on the display screen 2. From this phone number list window, the phone number of a person with whom the user wants to have a chat over the videophone is selected and determined through manual operations of the cross-like arrow buttons 7i and "Enter" button 7j (at item #3).

Upon determination of the phone number of such call destination, the processor 12 performs call request to the call destination—in this case, the other-side videophone function-added TV receiver 1' in FIG. 3—via the network I/F 15 and network 6 and, at the same time, reads a calling message window data from the memory for letting it be displayed on the display screen 2 and also renders the camera 4, microphone 5 and encoder 18 operative under control of the processor 12 (item #4).

Upon receipt of a reply from the other-side videophone function-added TV receiver 1' at the network I/F 15 via the network 6, such as the Internet, the processor 12 switches the operation mode of the decoder 11 to a state capable of executing the videophone-use decode function and then causes such operation to start. Whereby, a video telephone signal from the self-side apparatus (i.e., videophone function-added TV receiver 1), which signal is output from the encoder 18, is sent from the network I/F 15 via the network 6 to the other-side videophone function-added TV receiver 1' whereas a videophone signal from the other-side videophone function-added TV receiver 1' is received by the network I/F 15 via network 6 and decoded by the decoder 11, resulting in a video signal being supplied to the display panel 8 and an audio signal being fed to the speakers 3. In this way, videophone telecommunication is performed between the self-apparatus (i.e., videophone function-added TV receiver 1) and the other-side videophone function-added TV receiver 1' (at item #5).

After completion of the videophone call, when the user depresses the "Stop" button 7n of the remote control 7, the processor 12 renders the decoder 11 and HTML browser 13 inoperative. As the decoder 11 goes off, the processor 12 renders the camera 4 and microphone 5 plus encoder 18 inoperative (at item #6). Thus, the video phone function mode is terminated (item #7).

In the TV program-use decode function mode in which the videophone function-added TV receiver 1 receives a digital broadcast program, when the "Phone" button 7d of remote control 7 is pressed causing it to be switched to this videophone-use decode function mode, the processor 12 is responsive to completion of a videophone call by manual operation of the "Stop" button 7n of remote control 7, for providing control so that the decoder 11 changes its operation mode from the videophone-use decode function execution mode to the state for execution of the TV program-use decode function and then returns to the digital broadcast program reception state. In this case also, the decoder 11's videophone-use decode function execution is stopped; so, the processor 12 renders the camera 4 and microphone 5 plus encoder 18 inoperative.

In this way, in case the videophone function-added TV receiver 1 is in the TV broadcast program viewing function mode, when the function of the decoder 11 is switched from the TV program-use decode function to the videophone-use decode function in response to the user's manual operation of the "Phone" button 7d of remote control 7, the processor 12 may be arranged to render the storage unit 17 operative and permit the presently received digital broadcast program signal to be received continuously while letting the storage unit 17 continue videorecording until this digital broadcast program signal reception is ended. With such the arrangement, it is possible for the user to enjoy later the remaining part of a digital broadcast program that s/he failed to watch due to arrival of the incoming videophone call.

FIG. 6 is a diagram showing one example of incoming telephone call processing in the case where there is a call-in of the TV phone function-added TV receiver 1.

In FIG. 6, in case there is an incoming phone call from the other-side videophone function-added TV receiver 1', the inbound call detector 14 detects this in-call and notifies it to the processor 12. Upon receipt of this in-call notice, the processor 12 performs a control operation as will be described below in accordance with a present state of the videophone function-added TV receiver 1 and sets the videophone function-added TV receiver 1 in the videophone function mode. Below is an explanation of the incoming call reception processing in a way pursuant to a present state of the videophone function-added TV receiver 1.

(1) Power Off: This is a case where the videophone function-added TV receiver 1 is the power off state when there is an incoming telephone call from the other-side videophone function-added TV receiver 1'. In this case, the processor 12 receives an inbound call arrival notice from the inbound call detector 14 and determines whether the power is on or off. If the TV receiver 1 is in the off state, the power is turned on (automatic power-on).

In this case, the processor 12 turns the power on and judges the in-call notice is equivalent to that issued when the "Phone" button 7d of the remote control 7 is manually operated and then executes the "Phone Processing" shown in FIG. 5 from the item #2 thereof (phone processing). Then, after video/voice-based telecommunication is completed in response to a manual operation of either the "Stop" button 7n of the remote control 7 or a "Stop" button 7n' of a wireless remote control device 7' of the other-side videophone function-added TV receiver 1', if no videophone signal is received within a predetermined length of time period, the processor 12 determines that the videophone function mode is ended and then deactivates the videophone-use decode function of the decoder 11 and, at the same time, renders the camera 4 and microphone 5 plus encoder 18 inoperative at the item #6 of the "Phone Processing" shown in FIG. 5.

In this case, the decoder 11 stops its operation of the videophone-use decode function and, subsequently, is set in a state that the TV program-use decode function is made active—in other words, its function is switched from the videophone-use decode function to the TV program-use decode function, resulting in the decoder 11 being changed into the TV program-use decode function mode for reception of a digital broadcast program (TV watching).

In this way, when there is an incoming videophone call from the other-side videophone function-added TV receiver 1' while the videophone function-added TV receiver 1 is in the power off state, this videophone function-added TV receiver 1 is automatically set in the power-on state, causing it to be set in the videophone function mode to thereby establish the state enabling the user to talk with a calling party over the videophone. Thereafter, when the phone call is finished, the decoder 11 is switched from the videophone-use decode function to the TV program-use decode function, resulting in transfer to the TV program viewing function mode for letting the user watch his or her preferred digital broadcast program received.

(2) During TV Watching: This is a case where there is an incoming telephone call from the other-side videophone function-added TV receiver 1' while the videophone function-added TV receiver 1 is presently in the videophone function mode. In this case, the processor 12 receives an inbound call notice from the inbound call detector 14 and, at the same time, controls the storage unit 17 so that a digital broadcast signal being received is sequentially stored in this storage unit 17 (automatic videorecording start).

Simultaneously, the processor 12 renders the camera 4 and microphone 5 plus encoder 18 operative as has been explained using FIG. 5 and switches the function of decoder 11 from the TV program-use decode function to the videorecording-use decode function. As a result, video telecommunication with the other-side videophone function-added TV receiver 1' is performed (phone processing).

After completion of the phone call by manual operation of the "Stop" button 7n of the remote control 7 or the "Stop" button 7n' of remote control 7' of the other-side videophone function-added TV receiver 1', when any videophone signal is not received within a prespecified length of time period, the processor 12 determines that the videophone function mode is ended and thus deactivates the videophone-use decode function of the decoder 11 and, at the same time, renders the camera 4 and microphone 5 plus encoder 18 inoperative such as at the item #6 in the "Phone Processing" shown in FIG. 5.

In this case, the decoder 11 halts the videophone-use decode function in the way stated supra, resulting in activation of the TV program-use decode function—that is, the videophone-use decode function is switched to the TV program-use decode function. Then, the processor 12 controls the storage unit 17 so that playback of the received digital broadcast program signal gets started from its videorecording start part after the beginning of the above-stated phone call. This reproduced digital broadcast program signal is supplied to the decoder 11 and decoded thereby and then supplied to the display panel 8 and speakers 3, thereby enabling the user to enjoy it from the part which was interrupted by the above-noted phone call session (automatic playback start).

Note here that even when such automatic playback of the contents stored in the storage unit 17 is performed in this way, it sometimes happens that the digital broadcast program being presently received does not come to an end. If this is the case, the videorecording of this broadcast program signal is continued without interruption. The end of the digital broadcast program is acquirable from TV program guide information or else.

(3) During VOD Contents Watching: This is a case where a telephone call arrives from the other-side videophone function-added TV receiver 1' at the videophone function-added TV receiver 1 that is set in the VOD function mode. In this case, the processor 12 is operatively responsive to receipt of an inbound call notice from the inbound call detector 14, for pausing an operation of the VOD server 21 (automatic pause).

Then, as explained in FIG. 5, the processor 12 renders the camera 4 and microphone 5 plus encoder 18 operative and switches the function of decoder 11 from the VOD-use decode function to the videophone-use decode function. This permits execution of a telephone call with the other-side videophone function-added TV receiver 1' (phone processing).

After completion of the phone call by depression of the "Stop" button 7n of the remote control 7 or the "Stop" button 7n' of remote control 7' of the other-side videophone function-added TV receiver 1', when no videophone signal is received within a prespecified length of time period, the processor 12 judges that the TV broadcast program viewing function mode is ended and thus deactivates the videophone-use decode function of the decoder 11 and, at the same time, renders the camera 4 and microphone 5 plus encoder 18 inoperative such as at the item #6 in the "Phone Processing" shown in FIG. 5.

In this case, the decoder 11 stops the videophone-use decode function in the above-stated way, resulting in reactivation of the VOD-use decode function—that is, the videophone-use decode function is switched to the VOD-use decode function. Then, the processor 12 restarts the reception of the download contents from VOD server 21. This received signal indicative of VOD contents is supplied to the decoder 11 and decoded thereby and then supplied to the display panel 8 and speakers 3, thereby enabling the user to enjoy it from the part which was interrupted by the above-noted videophone call session (pause cancel).

(4) Others: Other modes includes, for example, an operation mode which is responsive to an image pickup instruction operation using the remote control 7, for activating the camera 4 and microphone 5 and for letting the encoder 18 perform the videorecording-use encode function to thereby cause the encoder 18 to encode a video signal obtained from the camera 4 and an audio signal from the microphone 5. When it is set in an image-capturing/storage mode for causing the storage unit 17 to store therein an image pickup signal thus obtained thereby, in case there is an incoming call from the other-side videophone function-added TV receiver 1', the camera 4 and microphone 5 plus encoder 18 are held in the activation state under control of the processor 12 and, simultaneously, the videorecording-use encode function is switched to the videophone-use encode function while deactivating the storage operation of the storage unit 17 (present state saving).

Then, as previously stated, the videophone function-added TV receiver 1 is set in the videophone function mode under control of the processor 12, thereby permitting telecommunication with the other-side videophone function-added TV receiver 1' (phone processing).

Upon completion of the phone call, the videophone function mode is cancelled under control of the processor 12 in the way stated supra. Simultaneously, while retaining the camera 4 and microphone 5 in the activated state, the function of encoder 18 is switched from the videophone-use encode function to the videorecording-use encode function, followed by causing the videorecording operation of the storage unit 17 to restart. This leads to restart of the operation for storage in the storage unit 17 while the encoder 18 encodes the video signal from camera 4 and the audio signal from microphone 5 (recovery to saved state).

In this way, when there is a telephone call while the videophone function-added TV receiver 1 is in the power-off state, videophone telecommunication becomes enabled. Upon completion of the call, the TV receiver is automatically switched to the state that permits the user to watch a digital broadcast program received. When the videophone function-added TV receiver 1 is in other modes, the TV receiver becomes in the videophone telecommunication capable state in quick response to such call-in. After completion of this videophone call, the TV receiver returns to its original state in the previous mode just before reception of the incoming call, followed by restart of the previous operation. Accordingly, after the phone call session, it is possible for the user to continuously use the videophone function-added TV receiver 1 in its original state without having to manually operate the remote control 7 for causing it to recover to the state before the call-in.

It should be noted here that after the phone call is ended in response to depression of the "Stop" button 7*n*' of the other-side videophone function-added TV receiver 1', if no videophone signal is received within a predetermined length of time period, the processor 12 determines that the videophone function mode is ended. That is, the processor 12 continues to monitor arrival of a videophone signal from the network I/F 15 in the videophone function mode. When such state is continued for the predetermined length of time since the failure to receive any signal, it judges that the videophone function mode is completed. The same goes with other videophone function-added TV receivers of distant parties, such as the other-side videophone function-added TV receiver 1'.

In this way, whenever an incoming phone call is received from a distant party at the other end of a line, the TV receiver 1 is automatically set in the videophone function mode without requiring the user to perform manual operations. When any videophone signal is no longer received, a decision is made to regard it as completion of the videophone function mode so that the videophone function mode is automatically ended without requiring any user's manual operations.

FIGS. 7A and 7B are flowcharts showing practical examples of forced start/stop control operations of the decoder and encoder, which are executed by respective processors upon start/end of a telephone call between the videophone function-added TV receivers 1 and 1' shown in FIG. 3.

It is noted that although the processing procedure in the videophone function mode shown in FIG. 5 and the incoming phone call handling processing shown in FIG. 6 indicate processing operations in the videophone function-added TV receivers 1 and 1', respectively, FIGS. 7A-7B are diagrams showing flows of processing operations between the videophone function-added TV receivers 1 and 1' in phone call starting and ending events.

Also note that while the explanation using FIGS. 7A-7B is under an assumption that each of the videophone function-added TV receivers 1 and 1' is arranged to have the structure and configuration shown in FIGS. 1-2, equivalent elements of the other-side videophone function-added TV receiver 1' are denoted by similar reference numerals with an apostrophe (') added thereto, such as decoder 11', processor 12', etc.

FIG. 7A shows forced startup control operations of the decoders 11 and 11' and encoders 13 and 13' of the videophone function-added TV receivers 1 and 1' in a phone call starting event, wherein an operation of the self-side videophone function-added TV receiver 1 of FIG. 3 is shown on the left side of FIG. 7A whereas an operation of the other-side videophone function-added TV receiver 1' of FIG. 3 is shown on the right side of FIG. 7A.

When the "Phone" button 7*d* of the remote control 7 for the videophone function-added TV receiver 1 is manually operated (at step 700), the HTML browser 13 gets started (step 701). The processor 12 sends an instruction from the network I/F 15 via network 6 to the other-side videophone function-added TV receiver 1' for rendering its decoder 11' operative (step 702). In the other-side videophone function-added TV receiver 1', this instruction is received at the network I/F 15'. Based on this instruction, the processor 12' renders the decoder 11' operative, thereby enabling execution of its videophone-use decode function (step 800). When the decoder 11' is activated in a mode for performing the videophone-use decode function, the processor 12' notifies, from the network I/F 15' via network 6, the self-side videophone function-added TV receiver 1 of the fact that the decoder 11' started up in the videophone-use decode function mode (step 801).

Upon receipt of this notice, the self-side videophone function-added TV receiver 1 operates so that its processor 12 renders the encoder 18 operative in the videophone-use encode function mode (at step 703 in FIG. 7A). Then, it activates the decoder 11 in the videophone-use decode function mode (step 704). Next, the processor 12 sends an instruction from the network I/F 15 via network 6 to the other-side videophone function-added TV receiver 1' for causing its encoder 18' to start up (step 705). In the other-side videophone function-added TV receiver 1', this instruction is received by the from the network I/F 15' and, in responding thereto, the processor 12' renders the encoder 18' operative to thereby enable execution of the videophone-use encode function (step 802). When the encoder 18' is activated in the videophone-use encode function mode, the processor 12' notifies, from the network I/F 15' via network 6, the self-side videophone function-added TV receiver 1 of the fact that the encoder 18' started up in the videophone-use encode function mode (step 803). This results in establishment of a state enabling videophone communication between the self-side videophone function-added TV receiver 1 and the other-side videophone function-added TV receiver 1' (step 706).

In the case where videophone communication is started between the self-side videophone function-added TV receiver 1 and the other-side videophone function-added TV receiver 1' in this way, when an instruction for phone call startup is sent through manual operations of the remote control 7 to one of the videophone function-added TV receivers, i.e., self-side videophone function-added TV receiver 1, several steps of operations are performed which follow: firstly, the decoder 11' is automatically rendered operative in the other-side videophone function-added TV receiver 1'; then, the decoder 11 and encoder 18 of the self-side videophone function-added TV receiver 1 are automatically activated in this order of sequence, thereby quickly enabling execution of a phone call from the self-side videophone function-added TV receiver 1 on the calling party side to the other-side videophone function-added TV receiver 1' on the called party side; next, the encoder 18' of other-side videophone function-added TV receiver 1' is activated to thereby enable execution of the phone call from the other-side videophone function-added TV receiver 1', which receives the call from the self-side videophone function-added TV receiver 1 and responds thereto, to the self-side videophone function-added TV receiver 1 whereby the videophone call handing is smoothly performed since the "Phone" button 7*d* of the remote control 7 was depressed.

FIG. 7B shows forced stop control operations of the decoders 11 and 11' and encoders 13 and 13' of the videophone function-added TV receivers 1 and 1' in a videophone call ending event, wherein an operation of the self-side videophone function-added TV receiver 1 of FIG. 3 is shown on the left side of FIG. 7B whereas an operation of the other-side videophone function-added TV receiver 1' of FIG. 3 is shown on the right side of FIG. 7B.

When the "Stop" button 7*n* of the remote control 7 for the videophone function-added TV receiver 1 is depressed (at step 710), the processor 12 performs deactivation processing of the decoder 11 (step 711). In this case, the decoder deactivation processing may be the one that actually renders the decoder 11 inoperative as has been described using FIGS. 5-6 or, alternatively, may be the one that causes decoder 11 to switch from the videophone-use decode function to the VOD-use decode function.

Then, the processor 12 sends a stop instruction notice from the network I/F 15 via network 6 to the other-side videophone function-added TV receiver 1' (at step 712 in FIG. 7B) and performs halt processing of the encoder 18 (step 713) whereby the phone call at the self-side videophone function-added TV receiver 1 is ended (step 716).

On the other hand, the halt(stop) instruction notice from the processor 12 to the other-side videophone function-added TV receiver 1' (at step 712) is the one that performs deactivation instruction of the decoder 11' in the other-side videophone function-added TV receiver 1' (step 714) and deactivation instruction of the encoder 18' therein (step 715). In the other-side videophone function-added TV receiver 1', when the processor 12' receives this instruction for stopping the decoder 11', deactivation processing of decoder 11' is performed (step 810). When the processor 12' receives the instruction for stopping the encoder 18', deactivation processing of encoder 18' is performed (step 811). This results in the videophone call being completed.

Additionally, when the communication is ended at the other-side videophone function-added TV receiver 1' also, the decoder 11' is deactivated in a similar way to the case of the self-side videophone function-added TV receiver 1 in some cases and the processing for switching from the videophone-use decode function to any one of the TV program-use decode function or VOD-use decode function is performed in other cases, resulting in the encoder 18' being rendered inoperative.

In this way, by the user's manual operation of the "Stop" button 7n of the remote control 7 on the side of self-side videophone function-added TV receiver 1, the following processing operations are performed: first, the decoder 11 of self-side in videophone function-added TV receiver 1 is deactivated, thereby preventing on-screen display and playback of video images and voice sounds of the phone call from the other-side videophone function-added TV receiver 1'; then, the encoder 18 is deactivated so that the video/voice information from the self-side videophone function-added TV receiver 1 is no longer displayed at the other-side videophone function-added TV receiver 1' in an automated way. Thus, it is possible to prevent unwanted visualization of an image on the distant party side even after the phone call was ended and also void undesired displaying of an image on the self side on the screen on the distant party side after completion of the phone call. In addition, as the technique is employed for sending the stop instructions of the decoder 11' and encoder 18' to the other-side videophone function-added TV receiver 1' from the self-side videophone function-added TV receiver 1, the other-side videophone function-added TV receiver 1' which receives the phone call from the self-side videophone function-added TV receiver 1 is such that the decoder 11' and encoder 18' are deactivated without requiring call ending operations using the remote control 7'. This makes it unnecessary for the user to perform manual operations for the call completion and thus avoids risks otherwise occurring due to the user's forgetting to perform such manual operations.

Note that although this practical example is arranged so that in the case of completion of the videophone function mode the decoder 11' and encoder 18' in the other-side videophone function-added TV receiver 1' are deactivated in response to receipt of the stop command from the self-side videophone function-added TV receiver 1 (at steps 714 and 715 in FIG. 7B), this may be modified so that the self-side videophone function-added TV receiver 1 is configured to send a command for deactivation of the decoder 11' to the other-side videophone function-added TV receiver 1' whereas this other-side TV receiver 1' is arranged so that its processor 12' detects deactivation of the decoder 11' and then renders the encoder 18' inoperative.

Alternatively, although the decoder 11, 11' halts the videophone-use decode function when no videophone signals are supplied thereto, the processor 12, 12' may be designed to detect such videophone-use decode function deactivation of decoder 11, 11' and then renders the encoder 18, 18' inoperative. In this case, the videophone-use decode function of decoder 11 is deactivated in response to completion of a videophone call, e.g., a manual operation of the "Stop" button 7n of the remote control 7 on the videophone function-added TV receiver 1 side; in responding thereto, the encoder 18 also is rendered inoperative, resulting in no videophone signal being sent from the videophone function-added TV receiver 1 to the other-side videophone function-added TV receiver 1'. Then, the decoder 11' in the other-side videophone function-added TV receiver 1' halts its videophone-use decode function due to the fact that no videophone signals are sent from the videophone function-added TV receiver 1; in response thereto, the processor 12' renders the encoder 18' inoperative. With such the arrangement, the videophone function mode is automatically quitted in the other-side videophone function-added TV receiver 1' even when no manual operations are performed for completion of this mode. In case the above-noted halt operation is done at the other-side videophone function-added TV receiver 1' also, similar mode deactivation is automatically performed at the videophone function-added TV receiver 1.

Still alternatively, although the encoder 18, 18' of videophone function-added TV receiver 1, 1' for performing videophone communication halts the videophone-use encode function in response to deactivation of the videophone-use decode function of decoder 11, 11' of the distant party's videophone function-added TV receiver 1', 1 that provides a videophone signal, the processor 12, 12' may be arranged to detect such videophone-use encode function deactivation of encoder 18, 18' and then halts the videophone-use decode function of decoder 11, 11'. In this case, when the videophone-use decode function of decoder 11 is halted in response to a manual operation of the "Stop" button 7n of the remote control 7 on the videophone function-added TV receiver 1 side as an example after having ended the videophone communication, the encoder 18' on the other-side videophone function-added TV receiver 1' side is rendered inoperative; upon detection of this deactivation, the processor 12' halts the videophone-use decode function of the decoder 11'. This results in the videophone function mode being automatically quitted at the other-side videophone function-added TV receiver 1' without requiring the user to manually perform a videophone function mode completion operation. In case a videophone call completion operation is done using the remote control 7' on the other-side videophone function-added TV receiver 1' side also, the videophone function mode is automatically ended at the self-side videophone function-added TV receiver 1.

Figure 8:
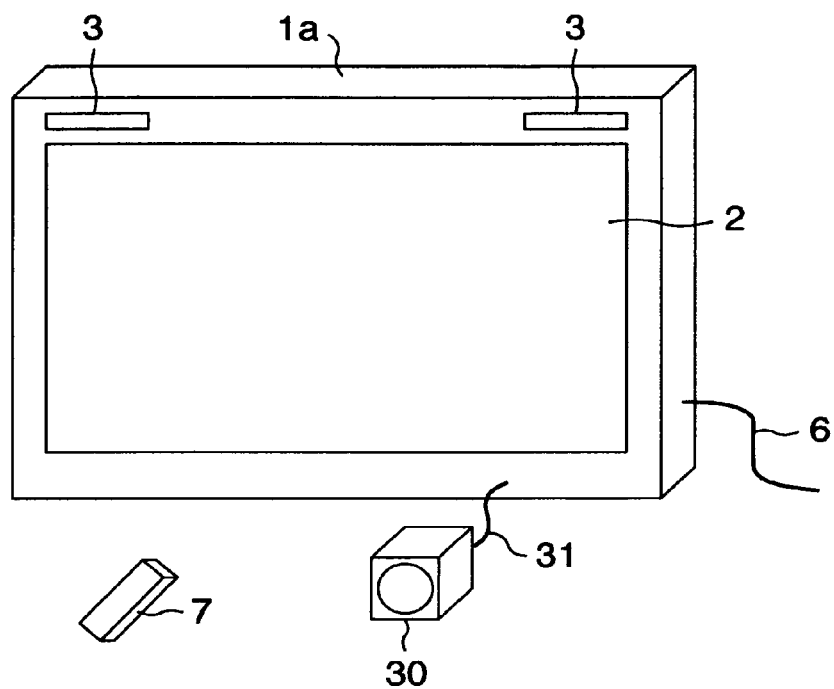
FIG. 8 is a diagram showing a perspective view of outer appearance of a videophone function-added TV receiver in accordance with a second embodiment.

FIG. 8 is a diagram showing a perspective view of exterior appearance of a TV receiver set with additional videophone functions in accordance with a second embodiment, wherein reference numeral 1a designates an apparatus main body, numeral 30 denotes a video camera, and 31 indicates a connection cable. Constituent elements corresponding to those shown in FIG. 1 are indicated by the same reference numerals, and a detailed explanation thereof is eliminated herein.

The second embodiment shown in FIG. 8 is arranged so that the video camera 30 is detachably connected by the connection cable 31 to the apparatus main body 1a of videophone function-added TV receiver 1. This video camera 30 is independently usable when disconnected from the apparatus main body 1a of videophone function-added TV receiver 1 and is also usable as a videophone equipment together with the apparatus main body 1a when linked by the connection cable 31 to the apparatus main body 1a of videophone function-added TV receiver 1.

In case the video camera 30 is coupled to the apparatus main body 1a by the connection cable 31 for use as part of the videophone equipment, this video camera is put at a lower location in front of the display screen 2 of apparatus main body 1a. In view of this, a couple of built-in loudspeakers 3 are mounted at specific positions above the display screen 2 in order to minimize unwanted mixture of audio sounds from a microphone (not shown) of the video camera 30 into these speakers 3.

It is noted that the apparatus main body 1a and the video camera 30 may be separately purchasable products or, alternatively, may be a set of products bundled together at the time of purchase.

Figure 9:
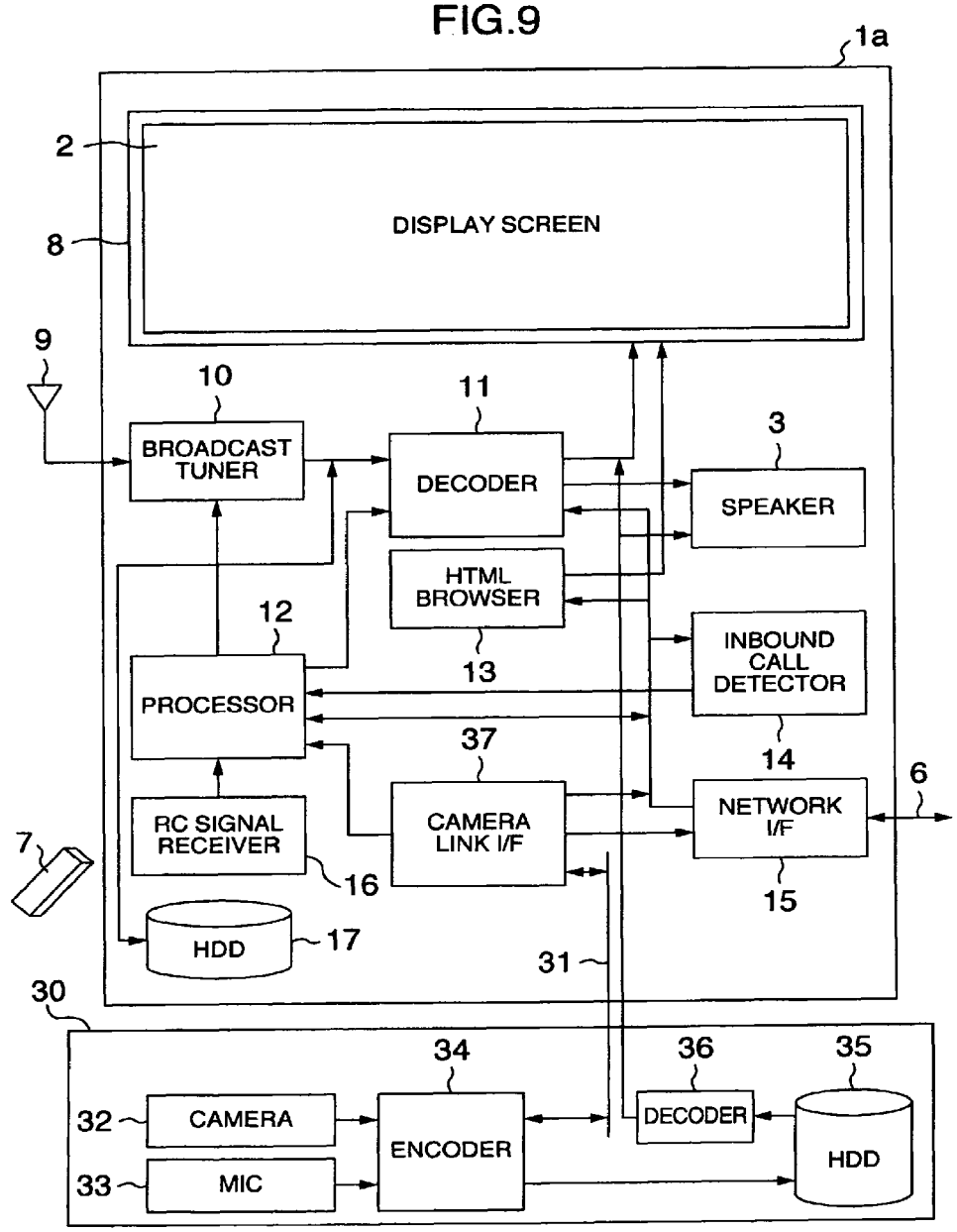
FIG. 9 is a block diagram showing a practical example of a circuit configuration of the videophone function-added TV receiver of the second embodiment shown in FIG. 8.

FIG. 9 is a block diagram showing a practical example of circuit configuration of the second embodiment of the TV phone function-added TV receiver shown in FIG. 8, which includes a camera 32, microphone 33, encoder 34, storage device 35, decoder 36, and camera connection interface (I/F) 37. Components corresponding to those shown in FIGS. 2 and 8 are designated by the same reference numerals, and a detailed explanation thereof is omitted herein.

As shown in FIG. 9, the video camera 30 has in its housing the camera 32, microphone 33, encoder 34, storage device 35 and decoder 36.

The encoder 34 has a videophone-use encode function and videorecording-use decode function. In a case where a videophone call is done by connecting the video camera 30 via connection cable 31 to apparatus main body 1a, the encoder 34 operates in a mode of the videophone-use encode function. In case the video camera 30 is disconnected from the apparatus main body 1a for independent use, the video camera 30 is set in a function mode (imaging/recording function mode) for storing in the storage device 35 a video signal from the TV built-in camera 32 and an audio signal from the microphone 33. At this time, the encoder 34 executes the encode function for the recording, that is, the videorecording-use decode function.

The decoder 36 of video camera 30 is the one that decodes a playback signal from the storage device 35.

When the video camera 30 is coupled via the connection cable 31 to the apparatus main body 1a, the encoder 34 of video camera 30 is connected by this cable 31 to the camera link I/F 37, and the decoder 36 is connected to the display panel 8. Although not specifically illustrated, the connection cable 31 has therein a control signal line(s) for supplying control signals that control respective parts of the video camera 30 from the processor 12 to the video camera 30 and a power supply line for feeding electrical power from the apparatus main body 1a to video camera 30.

When the apparatus main body 1a is in the power-on state, a connection state notifying signal which indicates whether the video camera 30 is connected or not is supplied to the processor 12 from the camera link I/F 37 that is provided within the apparatus main body 1a for connection of the video camera 30.

When the video camera 30 is connected to the apparatus main body 1a while the apparatus main body 1a is set in the power-on state by a manual operation of the "Power" button 7a of the remote control 7 or, alternatively, when the apparatus main body 1a, which has been turned off at the time point that the video camera 30 is connected to the apparatus main body 1a, is turned on by depression of the "Power" button 7a of remote control 7, a connection state notice signal indicative of connection of the video camera 30 is supplied from the camera link I/F 37 to processor 12.

The video camera 30 has its processor and an operation unit provided with several operation buttons, such as a power button, videorecording button, playback button, stop button and others, although these are not illustrated. The video camera 30 also has a built-in power supply unit; so, this camera is usable for video image capturing purposes even after disconnection from the apparatus main body 1a of videophone function-added TV receiver 1. The video camera 30 further includes a monitor display and loudspeaker(s), although not specifically depicted.

When the video camera 30 is used by disconnecting it from the apparatus main body 1a, the encoder 34 is set in a cumulative videorecording mode for execution of the videorecording-use decode function, which is an initial or "default" function. More specifically, when using the video camera 30 in the cumulative videorecording mode, power-on of the video camera 30 results in the camera 32 starting an image pickup operation to generate a video signal, which is supplied to the monitor so that a presently captured state is displayed on its screen. Simultaneously, the encoder 34 is set in a state for execution of the videorecording-use encode function. Then, when the record button of the video camera 30 is depressed, a video signal from the camera 32 and an audio signal from the microphone 33 are encoded by the encoder 34 and cumulatively recorded in the storage device 35 as a video shot signal. When the stop button is pressed, this cumulative videorecording operation is halted. When the playback button is pressed, the video shot signal being stored in the storage unit 35 is played back and displayed on the monitor screen of the video camera 30.

When the "Power" button 7a (FIG. 4) of the wireless remote control 7 is depressed after having connected the video camera 30 by connection cable 31 to apparatus main body 1a of videophone function-added TV receiver 1, the apparatus main body 1a is turned on; simultaneously, the video camera 30 also is rendered operative due to the fact that a power supply voltage is supplied thereto from the apparatus main body 1a through connection cable 31.

In the power-on state of the apparatus main body 1a, when the "Play" button $7m_2$ (FIG. 4) of remote control 7 is depressed, the processor 12 sends a playback control signal to the processor of the video camera 30 whereby the video camera 30 operates to read the video signal being stored in the storage device 35 and then supply it to the display panel 8 and speakers 3 for playback required. In case a digital broadcast program signal being stored in the storage device 17 is played back, the "TV" button 7b (FIG. 4) of remote control 7 is pressed to set the videophone function-added TV receiver 1 in the TV broadcast program viewing function mode; thereafter, the "Play" button $7m_2$ of remote control 7 is manually operated.

In the state that the video camera 30 is coupled to the apparatus main body 1a, when "Phone" button 7d of the remote control 7 is depressed, the apparatus main body 1a is such that the decoder 11 and HTML browser 13 get started in a similar way to the above-stated first embodiment so that the decoder 11 is set in the state for execution of the videophone-use decode function. When the video camera 30 is turned on due to power feed, the encoder 34 is set in a state of live output mode for execution of the videophone-use encode function under control of the processor 12. Whereby, the videophone function-added TV receiver 1 is set in the videophone function mode.

This live output mode is the mode for supplying an output signal (video shot signal) of the encoder 34 to the apparatus main body 1a while minimizing the length of its transmission time. In this mode, a video signal from the camera 32 and audio signal from microphone 33 are encoded by the encoder 34 and directly supplied to the camera link I/F 37 of apparatus main body 1a without passing through the storage device 35.

In the videophone function mode, the video signal from the camera 32 and audio signal from microphone 33 are encoded by the encoder 34 that is set in the videophone-use encode function mode and then supplied to the apparatus main body 1a as a videophone signal. This signal is received by the camera link I/F 37 in apparatus main body 1a and then supplied to network I/F 15 and thereafter sent via network 6 to a videophone function-added TV receiver set 1' of a distant party at the other end of a line—say, "other-side" videophone function-added TV receiver. A videophone signal from this other-side videophone function-added TV receiver 1' is received by the network I/F 15 and decoded by the decoder 11 and then fed to the display panel 8 and speakers 3 in a similar way to the first embodiment stated supra.

In case there is an incoming call from the other-side videophone function-added TV receiver 1' also, a similar operation to that of the first embodiment is performed although the second embodiment is such that the video camera 30 is rendered operative under control of the processor 12, thereby setting its encoder 34 in the live output mode for execution of the videophone-use encode function.

In case the videophone function mode is terminated, the "Stop" button 7n of remote control 7 is depressed in a similar way to the above-stated first embodiment. Whereby, the processor 12 halts the HTML browser 13 and, at the same time, disables the videophone-use decode function of decoder 11 for switching it to another decode function. In addition, the processor 12 turns the video camera 30 off to stop the operation of video camera 30.

Regarding the VOD function mode of the videophone function-added TV receiver 1, this is similar to that of the first embodiment stated supra.

Figure 10:
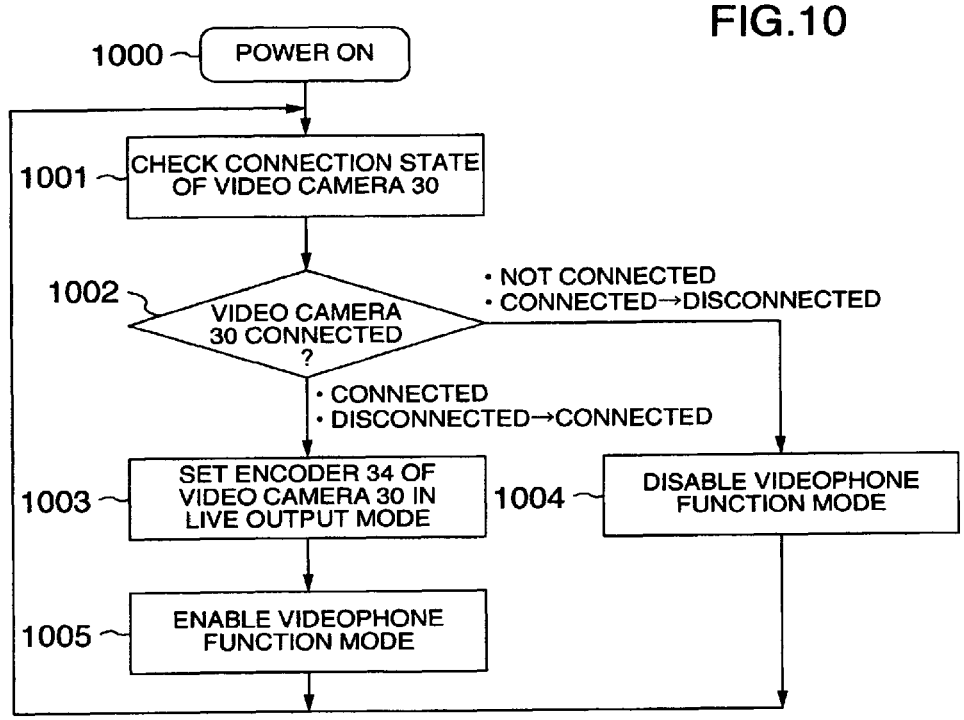
FIG. 10 is a flowchart showing a procedure for connect control of a video camera of FIG. 9 to be performed by a processor in videophone function mode.

FIG. 10 is a flowchart showing the connect control that is performed by the processor 12 in the videophone function mode of the video camera 30 shown in FIG. 9.

As shown herein, when the apparatus main body 1a of videophone function-added TV receiver 1 is powered on by a manual operation of the "Power" button 7a of the remote control 7 (at step 1000), verification is made to determine whether the video camera 30 is connected to this apparatus main body 1a (step 1001). When it is detected using a connection state notice signal from the camera link I/F 37 that the video camera 30 is not yet coupled to the apparatus main body 1a or, alternatively, is disconnected therefrom (step S1002), the processor 12 disables the use of the videophone function mode and causes a message of this content to be displayed on the display screen 2 of display panel 8 (step 1004). Alternatively, when it is detected based on the connection state notice signal that the video camera 30 is connected to the apparatus main body 1a or detected that the disconnected video camera 30 is now coupled thereto (step 1002), the processor 12 enables the power supply voltage to be fed to the video camera 30 and forces its encoder 34 to go into the videophone-use encode function executable mode (i.e., enables it to operate in the live output mode) (step 1003), thereby setting the videophone function-added TV receiver 1 in a state that it is usable in the videophone function mode (step 1005). In this state, when the "Phone" button 7d of the remote control 7 is manually operated, or alternatively, when there is an incoming call from the other-side videophone function-added TV receiver 1', the videophone function mode is set up in the way stated previously, resulting in the TV receiver 1 becoming capable of making a videophone call with the other-side videophone function-added TV receiver 1'.

Figure 11:
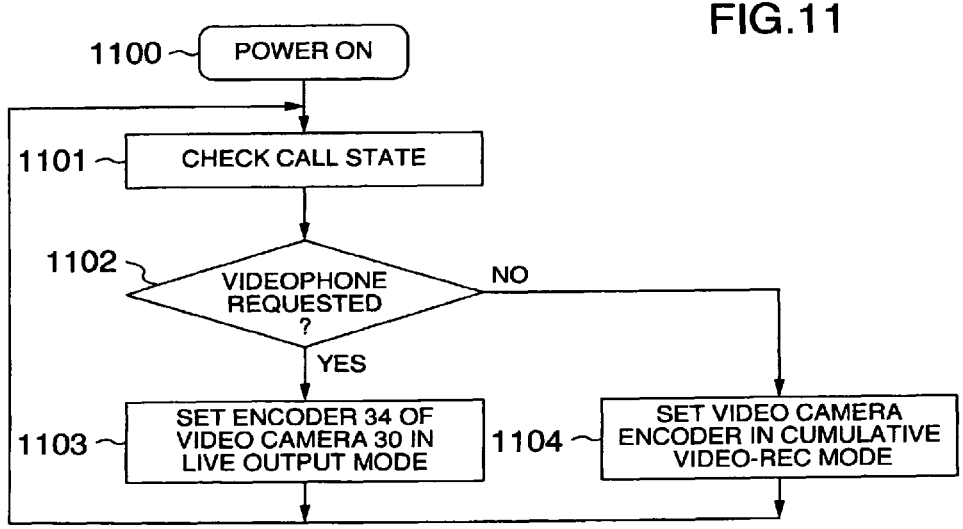
FIG. 11 is a flowchart showing a procedure for select control of an operation mode of the video camera in FIG. 9.

FIG. 11 is a flowchart showing select control of an operation mode of the video camera 30 in FIG. 9.

As shown herein, when the video camera 30 is powered on (at step 1100), the built-in processor of video camera 30 checks whether an instruction for setup of the videophone function mode is received from the apparatus main body 1a of videophone function-added TV receiver 1 (step 1101).

As previously stated, the power-on of video camera 30 at the step 1100 is performed by manual operation of the "Power" button at the operation unit of this video camera 30 when the video camera 30 is not connected to the apparatus main body 1a; when video camera 30 is connected to the apparatus main body 1a, the power-on is done in response to receipt of an instruction signal from the processor 12 of apparatus main body 1a, which signal is generated in response to receipt of a videophone function mode setup instruction due to depression of the "Phone" button 7d of remote control 7.

The checking of the videophone function mode setup instruction from the apparatus main body 1a at the step 1101 is for verifying whether this instruction is sent from the processor 12 of apparatus main body 1a via the camera link I/F 37, and when such videophone function mode setup instruction is received from the remote control 7 to the videophone function-added TV receiver 1, the processor 12 outputs a videophone function mode setup instruction signal to the video camera 30 via camera link I/F 37, which signal is for causing video camera 30 to execute the live output.

Then, in the video camera 30, when it is made sure by its processor as a result of the checking at the step 1101 that there is the videophone function mode setup instruction from the apparatus main body 1a (i.e., if YES at step 1102), this processor sets the operation mode of encoder 34 to the live output mode for execution of the videophone-use encode function (step 1103). Alternatively, when it is affirmed that there is no such videophone function mode setup instruction from the apparatus main body 1a (i.e., if NO at step 1102), this case is any one of the following events: no videophone function mode setup instruction is sent from the remote control 7 to videophone function-added TV receiver 1; and the video camera 30 is disconnected from apparatus main body 1a. If this is case, at the video camera 30, its processor sets the encoder 34 in the cumulative videorecording mode for execution of the videorecording-use encode function (step 1104).

In this way, in the video camera 30, whether the apparatus main body 1a side is in a phone call enable state or in an out-of-call state is recognized. In accordance with this recognition result, the operation mode of encoder 34 is set up, followed by execution of compression processing (encoding) of moving-picture images on a per-image basis.

Although here the video camera 30 is arranged so that a notice from the processor 12 which is issued due to setup of the apparatus main body 1a in the videophone function mode is used to recognize whether the apparatus main body 1a side is in the phone call enable state or in the call disable state, in view of the fact that when the apparatus main body 1a and the video camera 30 are connected together by the connection cable 31 the connection state notice signal is supplied from the camera link I/F 37 to processor 12 to thereby recognize that the video camera 30 was linked to apparatus main body 1a, another arrangement is employable for causing the processor 12 in such event to notify this state to the video camera 30 to thereby determine whether the apparatus main body 1a is presently set in the call enable state or call disable state and for setting the encoder 34 in the live output mode for execution of the videophone-use encode function. With this arrangement, whenever the apparatus main body 1a is set in the videophone function mode, the video camera 30 is forced to quickly operate in the videophone function mode.

The above-stated operations should not be limited only to the video camera which is detachably connected to the apparatus main body 1a of videophone function-added TV receiver 1. For example, in case the videophone function-added TV receiver 1 of FIG. 9 is modified to internally contain the camera 32, microphone 33, encoder 34 and storage device 35 in the apparatus main body 1a, these camera 32, microphone 33, encoder 34 and storage device 35 may be arranged to perform the operations shown in FIG. 11, wherein the encoder 34 may be designed to go into the live output mode in the videophone function mode and operate in the cumulative videorecording mode when the TV receiver operates in modes other than the videophone function mode.

Examples of the connection cable 31 are the currently available standard video cables including, but not limited to, a high-definition multimedia interface (HDMI) signal cable and a digital video interface (DVI) signal cable.

This second embodiment also is the one that is similar in arrangement to the videophone function-added TV receiver 1 of the first embodiment shown in FIG. 2 when looking at an entirety of videophone function-added TV receiver 1 (the camera 32, microphone 33 and encoder 34 in video camera 30 are equivalent respectively to the camera 4, microphone 5 and encoder 18 in FIG. 2). Its operation in each mode is the one that executes a corresponding one of the operations shown in FIGS. 5 to 7. Additionally, although the other-side videophone function-added TV receiver 1' is such that its decoder 11' and encoder 34' are rendered inoperative in responding to receipt of a deactivation instruction from the self-side videophone function-added TV receiver 1 (at steps 714 and 715 in FIG. 7B), this TV receiver may be modified so that when the decoder 11' is halted in response to receipt of a deactivation instruction of such decoder 11' as sent from the self-side videophone function-added TV receiver 1, the processor 12' detects this operation halt and then stops the encoder 34'.

In addition, in view of the fact that the decoder 11, 11' stops the videophone-use decode function when no videophone signal is supplied thereto, the second embodiment may be arranged in a similar manner to the first embodiment stated supra in a way which follows: upon completion of a videophone call, the videophone-use decode function of decoder 11 is deactivated by, for example, manual operation of the "Stop" button 7n of remote control 7 on the videophone function-added TV receiver 1 side; then, the encoder 18 also is rendered inoperative subsequently, resulting in no videophone signal being sent from the videophone function-added TV receiver 1 to other-side videophone function-added TV receiver 1' whereby the decoder 11' deactivates the videophone-use decode function; in responding thereto, the processor 12' renders the encoder 18' inoperative. Even in case the above-stated deactivation operation is done on the other-side videophone function-added TV receiver 1' side, similar mode deactivation is automatically performed on the videophone function-added TV receiver 1 side.

Although the encoder 18, 18' of videophone function-added TV receiver 1, 1' that performs videophone communication is arranged to halt the videophone-use encode function in response to deactivation of the videophone-use decode function of the decoder 11', 11 of its associative videophone function-added TV receiver 1', 1, the decoder 11, 11' may be modified to halt the videophone-use decode function in response to deactivation of the videophone-use encode function of encoder 18, 18' as detected by the processor 12, 12'. In this case, upon completion of a videophone call, when the videophone-use decode function of decoder 11 is halted by depression of the "Stop" button 7n of the remote control 7 on the videophone function-added TV receiver 1 side as an example, the encoder 18' of the other-side videophone function-added TV receiver 1' is rendered inoperative; upon detection of this deactivation by the processor 12', the decoder 11' is caused to stop the videophone-use decode function. With this arrangement, the videophone function mode is automatically ended in the other-side videophone function-added TV receiver 1' even when no videophone function mode completion operations are performed. In case the stop operation is done using the remote control 7' on the other-side videophone function-added TV receiver 1' side also, the videophone function mode is automatically ended in the self-side videophone function-added TV receiver 1 in a similar way.

Figure 12:
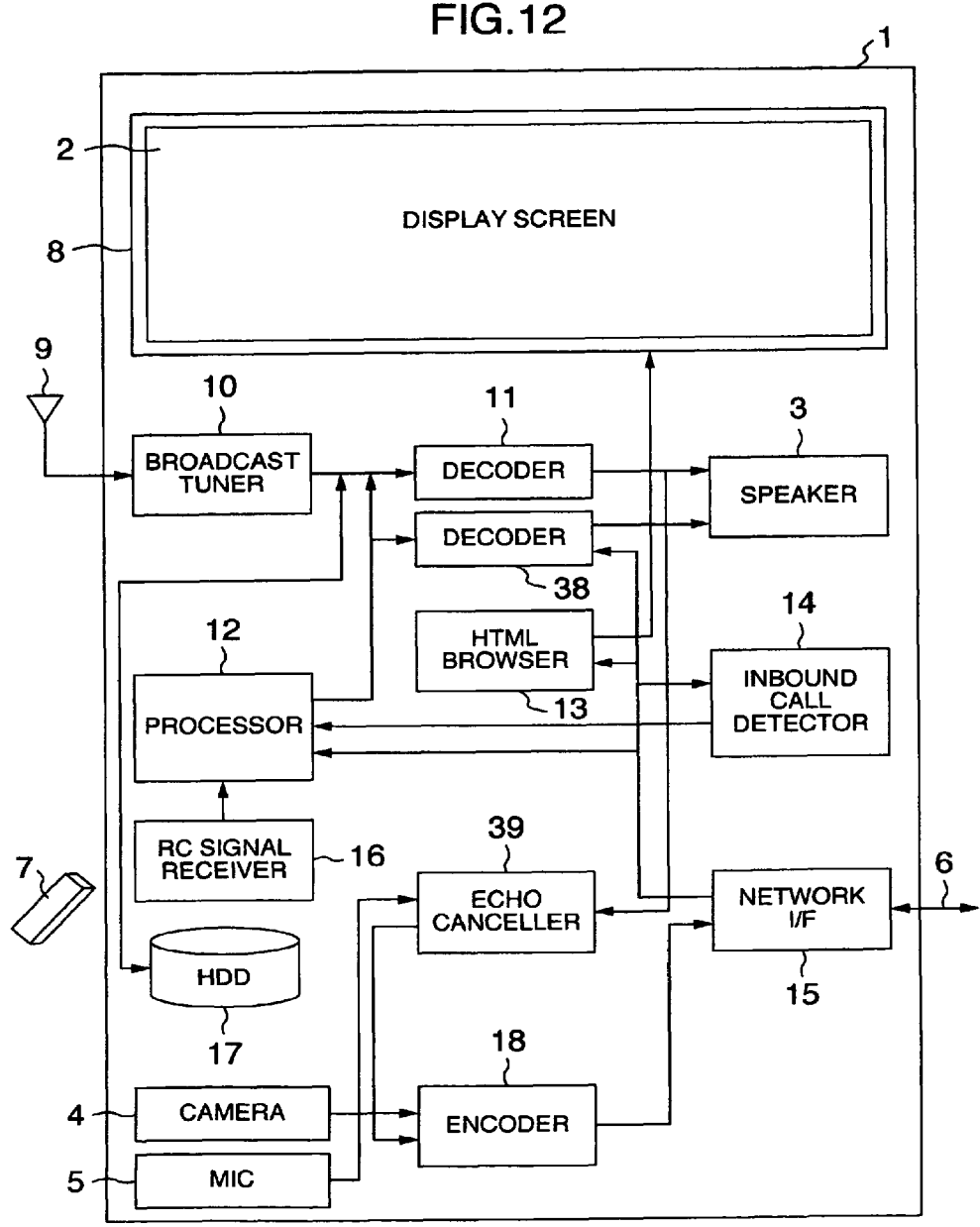
FIG. 12 is a block diagram showing a practical example of a circuit configuration of a videophone function-added TV receiver in accordance with a third embodiment.

FIG. 12 is a block diagram showing a circuit configuration of a videophone function-added TV receiver set in accordance with a third embodiment, which includes a decoder 38 and an echo canceller 39. Components corresponding to those shown in FIG. 1 are denoted by the same reference numerals, and detailed explanations thereof are eliminated herein.

This third embodiment of FIG. 12 is different from the videophone function-added TV receiver 1 of the first embodiment shown in FIG. 2 in that the decoder 11 has only the TV program-use decode function and thus is for exclusive use in the TV broadcast program viewing function mode and in that the decoder 38 is additionally provided, which is for use in the videophone function mode and VOD function mode. This decoder 38 is connected to the network I/F 15. Also provided is the echo canceller 39 which removes or "cancels" an audio signal of a digital broadcast program signal of speakers 3 from an audio signal as output from microphone 5.

In the third embodiment also, it is possible by the above-stated operation of the wireless remote control 7 to individually set up any one of the TV broadcast program viewing function mode and videophone function mode and VOD function mode in a similar way to the first embodiment shown in FIG. 2. When it is set in the TV broadcast program viewing function mode, the decoder 11 is rendered operative under control of the processor 12 whereby a digital broadcast program signal from broadcast tuner 10 is decoded by the decoder 11 so that its video signal is supplied to the display panel 8 while letting an audio signal be fed to the speaker unit 3. In either the videophone function mode or the VOD function mode, the decoder 38 is set by the processor 12 in an operation mode for execution of either the videophone-use decode function or VOD-use decode function whereby any one of a videophone call signal from the other-side videophone function-added TV receiver 1' which is received by the network I/F 15 or VOD contents is supplied to the decoder 38 and then decoded thereby (text information of VOD data is converted by HTML browser 13 into a video signal) so that its video signal is supplied to the display panel 8 with an audio signal being fed to the speaker 3.

Additionally in the third embodiment, the digital broadcast program signal and any one of the videophone call signal and VOD contents are simultaneously receivable and decodable in response to a manual operation of the remote control 7 to thereby enable these different video images to be displayed on the screen of the display panel 8—that is, these images are displayable on two separate windows on the display screen.

The manual operation of remote control 7 in this case is as follows. The remote control 7 with the arrangement shown in FIG. 4 has a button for displaying two windows on one screen, i.e., "Two-Window Display" button. For example, this "Two-Window Display" button is pushed when the TV broadcast program viewing function mode is set up by depression of the "TV" button 7b; then, either the "Phone" button 7d or the "VOD" button 7c is pushed to thereby set up the two-window display mode so that two-window display is performed.

In this two-window display mode, audio signals that are output from the decoder 11 and decoder 38 are simultaneously supplied to the speakers 3 in response to the manual operation of a select button (not shown in FIG. 4) that is provided at the remote control 7.

Incidentally, in the two-window display mode for displaying both a received digital broadcast program and a videophone signal at a time, audio/voice sounds from the speakers 3 can be taken into the microphone 5 and thus undesirably mixed into a telephone voice signal being input to the microphone 5, although each speaker 3 is spaced apart from the microphone 5 to have a certain degree of distance therefrom in a similar manner to the first embodiment shown in FIG. 1. In this case, a voice signal that is supplied to the speakers 3 contains an audio signal of the received digital broadcast program signal from the decoder 11 so that a signal which is derived from audio components of the digital broadcast program is superimposed with an output audio signal of the microphone 5. When this signal is transmitted to the other-side videophone function-added TV receiver 1', a distant party at the other end of a line becomes harder to catch the intended voice. In another case, the audio sounds of the digital broadcast program that is received by the videophone function-added TV receiver 1 is leaked into the presently linked other-side videophone function-added TV receiver 1'. This poses problems as to privacy infringement and security impingement.

Figure 13:
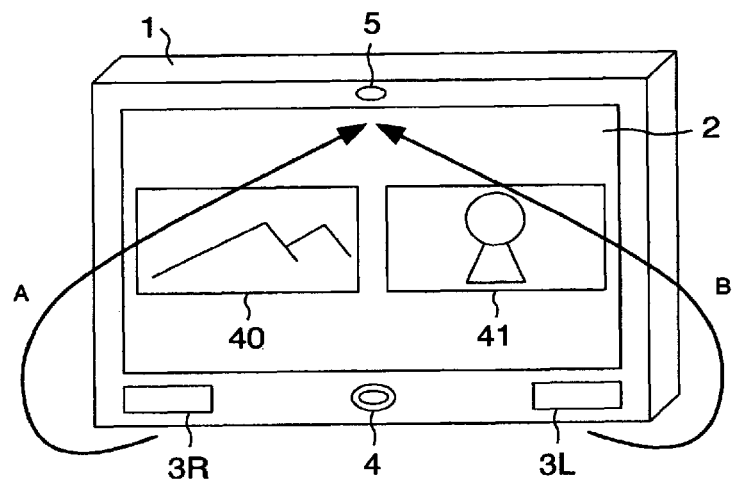
FIG. 13 is a diagram for explanation of leakage of audio sounds from a pair of loudspeakers to a microphone in the videophone function-added TV receiver shown in FIG. 12.

FIG. 13 is a diagram showing an exemplary two-window display state of the third embodiment, wherein the speaker unit 3 consists of a right-side speaker 3R and left-side speaker 3L and wherein a digital broadcast program display window 40 and a videophone-use window display 41 are simultaneously displayed on the display screen 2 on a side-by-side way. Components corresponding to those of FIG. 1 are indicated by the same reference numerals, and detailed explanations thereof are eliminated herein.

In the case of the two-window display mode shown in FIG. 13, the digital broadcast program viewing window 40 is displayed on one side—here, the left-hand side—whereas the videophone image window 41 which visualizes the image of a calling or called person is displayed on the other side—here, the right-hand side. In this case, audio sounds A and B that are produced from the right-side speaker 3R and left-side speaker 3L of the speaker unit 3 provided in the self-side videophone function-added TV receiver 1 are also picked up by the microphone 5, which is mounted in the display panel housing.

Note here that although in this example the digital broadcast program viewing window 40 is displayed on the left side of the display screen 2 whereas the videophone image window 41 is displayed on the right side thereof, the display positions of these windows may be laterally exchanged with each other. Additionally, these windows may be differed in size from each other. An example is that the digital broadcast program viewing window 40 is enlarged whereas the videophone image window 41 is made smaller.

To avoid the mixture or "invasion" of audio sounds of speakers 3R and 3L into the microphone 5, the third embodiment is arranged to have the echo canceller 30 as shown in FIG. 12. The voice signal sensed by the microphone 5 is supplied to this echo canceller 39; simultaneously, the audio signal of the received digital broadcast program as output from the decoder 11 is supplied to the echo canceller 39. At this time, the echo canceller 39 performs cancel processing to thereby remove from the output voice signal of the microphone 5 the audio signal of the digital broadcast program from the speakers 3 (i.e., right and left speakers 3R and 3L) which is mixed thereinto by use of the output audio signal of the decoder 11, and then outputs an echo-cancelled audio signal, which is supplied to the encoder 18.

Figure 14:
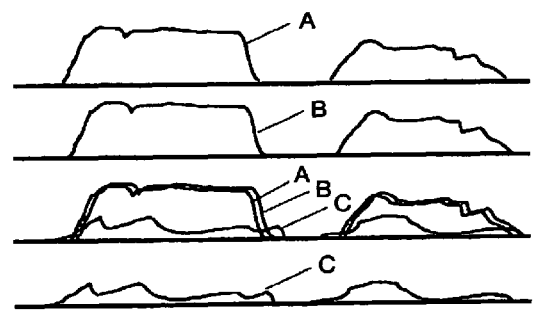
FIG. 14 is a diagram schematically showing waveforms of some major signals for explanation of an operation of an echo canceller shown in FIG. 12.

FIG. 14 shows waveform diagrams of some major signals for explanation of the operation of the echo canceller 39.

More specifically, FIG. 14(*a*) shows an audio signal "A" which is output from the decoder 11 to the right-side speaker 3R, and FIG. 14(*b*) shows an audio signal B that is output from the decoder 11 to the left-side speaker 3L. FIG. 14(*c*) shows an output audio signal of the microphone 5, which is a videophone voice signal C with the audio signals A and B being superimposed thereon. The echo canceller 39 functions to subtract and remove from this output signal of the microphone 5 both the audio signal A being output from the decoder 11 to the right speaker 3R and the audio signal B being output to the left speaker 3L. With this TV sound canceling operation, only the audio signal C of the telephone voice as input to the microphone 5 is output from the echo canceller 39 as shown in FIG. 14(*d*) and then supplied to the encoder 18.

In this way, even when both the received digital broadcast program's video image and the image of a distant party at the other end of a line are simultaneously displayed side-by-side on the display screen while letting respective audio/voice sounds be output from the speakers 3, it is possible to limit an audio signal being picked up by the microphone 5 and sent to the distant party to the telephone voice signal only. This makes it possible to smoothly perform videophone telecommunication without impairing the privacy and security as to the presently watched digital broadcast program.

Although the third embodiment is configured to perform operations in respective modes which are equivalent to those shown in FIGS. 5 to 7 in a similar way to the first embodiment stated supra and is designed so that the decoder 11' and encoder 34' in the other-side videophone function-added TV receiver 1' are rendered inoperative in response to receipt of a deactivation command from the self-side videophone function-added TV receiver 1 (at steps 714 and 714 in FIG. 7B), the embodiment may be modified so that the self-side videophone function-added TV receiver 1 sends a command for deactivation of the decoder 11'. In this case, when the decoder 11' is deactivated in response to this command, the processor 12' detects it and then renders the encoder 34' inoperative.

In addition, in view of the fact that the decoder 11, 11' stops the videophone-use decode function when no videophone signal is supplied thereto, the second embodiment may be arranged in a similar manner to the first embodiment stated supra in a way which follows: upon completion of a videophone call, the videophone-use decode function of decoder 11 is deactivated by, for example, manual operation of the "Stop" button 7n of remote control 7 on the videophone function-added TV receiver 1 side; then, the encoder 18 also is rendered inoperative subsequently, resulting in no videophone signal being sent from the videophone function-added TV receiver 1 to other-side videophone function-added TV receiver 1' whereby the decoder 11' deactivates the videophone-use decode function; in responding thereto, the processor 12' renders the encoder 18' inoperative. Even in case the above-stated deactivation operation is done on the other-side videophone function-added TV receiver 1' side, similar mode deactivation is automatically performed on the videophone function-added TV receiver 1 side.

Although the encoder 18, 18' of videophone function-added TV receiver 1, 1' that performs videophone communication is arranged to halt the videophone-use encode function in response to deactivation of the videophone-use decode function of the decoder 11', 11 of its associative videophone function-added TV receiver 1', 1, the decoder 11, 11' may be modified to halt the videophone-use decode function in response to deactivation of the videophone-use encode function of encoder 18, 18' as detected by the processor 12, 12'. In this case, upon completion of a videophone call, when the videophone-use decode function of decoder 11 is halted by depression of the "Stop" button 7*n* of the remote control 7 on the videophone function-added TV receiver 1 side as an example, the encoder 18' of the other-side videophone function-added TV receiver 1' is rendered inoperative; upon detection of this deactivation by the processor 12', the decoder 11' is caused to stop the videophone-use decode function. With this arrangement, the videophone function mode is automatically ended in the other-side videophone function-added TV receiver 1' even when no videophone function mode completion operations are performed. In case the stop operation is done using the remote control 7' on the other-side videophone function-added TV receiver 1' side also, the videophone function mode is automatically ended in the self-side videophone function-added TV receiver 1 in a similar way.

Further note that although this third embodiment is arranged so that the camera 4 and microphone 5 plus encoder 18 are internally built in the housing of videophone function-added TV receiver 1, the embodiment may be modified in a similar manner to the second embodiment shown in FIG. 9 so that it uses a detachable video camera in the apparatus main body of the videophone function-added TV receiver 1, which camera is used in a similar way to the video camera 30 of the second embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A digital information receiving and transmitting apparatus comprising:
    a network interface configured to:
    receive a first digital information including a first video information and a first audio information from a content server via a network;
    receive a second digital information including a second video information and a second audio information from other communication apparatus via the network; and
    transmit a third digital information including a third video information and a third audio information to the other communication apparatus via the network; and
    a processor configured to output the first video information and the second video information on a display, and output the first audio information and the second audio information through a speaker;
    wherein when a videophone communication is started after receiving, from the other communication apparatus, an inbound videophone call in the middle of outputting the first video information received by the network interface, the processor outputs the second video information received from the other communication apparatus via the network interface;
    when the videophone communication is finished, the processor stops outputting the second video information received by the network interface; and
    wherein the processor stops an operation of a camera creating the third video information in a case that the processor receives a stop instruction of the videophone communication from the other communication apparatus.

2. The digital information receiving and transmitting apparatus according to claim 1, wherein when receiving the inbound videophone call, the processor pauses a process of receiving the first digital information.

3. The digital information receiving and transmitting apparatus according to claim 2, wherein after the videophone communication is finished, the processor restarts the process of receiving the first digital information.

4. The digital information receiving and transmitting apparatus according to claim 2, further comprising:
    a browser configured to display the first video information after decoding the first video information; and
    a videophone communicator configured to display the second video information after decoding the second video information.

5. The digital information receiving and transmitting apparatus according to claim 2, wherein the first digital information is received from the content server after billing process is performed for a selected content.

6. The digital information receiving and transmitting apparatus according to claim 1, wherein the processor stops an operation of a camera creating the third video information in a case that the processor does not receive the second video information or the second audio information for a preset time from the other communication apparatus.

7. The digital information receiving and transmitting apparatus according to claim 1, wherein when receiving the inbound videophone call, the processor pauses an output of the first video information.

8. The digital information receiving and transmitting apparatus according to claim 7, wherein after the videophone communication is finished, the processor restarts the output of the first video information.

9. The digital information receiving and transmitting apparatus according to claim 7, wherein after the videophone communication is finished, the processor restarts the output of the first video information from a part which the output was paused.

10. The digital information receiving and transmitting apparatus according to claim 1, wherein when receiving the inbound videophone call, the processor communicates with the content server for pausing a download operation for the first video information.

11. The digital information receiving and transmitting apparatus according to claim 10, wherein after the videophone communication is finished, the processor restarts the download operation for the first video information.

12. The digital information receiving and transmitting apparatus according to claim 11, further comprising:
    a browser configured to display the first video information after decoding the first video information; and
    a videophone communicator configured to display the second video information after decoding the second video information.

13. The digital information receiving and transmitting apparatus according to claim 10, wherein after the videophone communication is finished, the processor restarts an output of the first video information.

14. The digital information receiving and transmitting apparatus according to claim 10, further comprising:
- a browser configured to display the first video information after decoding the first video information; and
- a videophone communicator configured to display the second video information after decoding the second video information.

15. The digital information receiving and transmitting apparatus according to claim 1, further comprising:
- a decoder configured to decode the first video information and the second video information;
- wherein the processor is configured to output the first video information after decoding the first video information received from the content server, or is configured to output the second video information after decoding the second video information received from the other communication apparatus as the videophone communication.

16. The digital information receiving and transmitting apparatus according to claim 1, further comprising:
- a browser configured to display the first video information after decoding the first video information.

17. The digital information receiving and transmitting apparatus according to claim 1, further comprising:
- a browser configured to display the first video information after decoding the first video information; and
- a videophone communicator configured to display the second video information after decoding the second video information.

18. The digital information receiving and transmitting apparatus according to claim 1, wherein the first digital information is received from the content server after billing process is performed for a selected content.

* * * * *